United States Patent
Okazaki et al.

(10) Patent No.: US 11,155,704 B2
(45) Date of Patent: Oct. 26, 2021

(54) METHACRYLIC RESIN COMPOSITION AND MOLDED OBJECT THEREOF

(71) Applicant: Sumitomo Chemical Company, Limited, Tokyo (JP)

(72) Inventors: Ryosuke Okazaki, Niihama (JP); Hidenori Kadoya, Niihama (JP); Kazuhiro Yamazaki, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 260 days.

(21) Appl. No.: 16/324,972

(22) PCT Filed: Sep. 25, 2017

(86) PCT No.: PCT/JP2017/034434
§ 371 (c)(1),
(2) Date: Feb. 12, 2019

(87) PCT Pub. No.: WO2018/066393
PCT Pub. Date: Apr. 12, 2018

(65) Prior Publication Data
US 2020/0172646 A1 Jun. 4, 2020

(30) Foreign Application Priority Data
Oct. 4, 2016 (JP) .............................. JP2016-196269

(51) Int. Cl.
C08L 33/12 (2006.01)
C08F 220/14 (2006.01)
C08F 2/00 (2006.01)

(52) U.S. Cl.
CPC ............ *C08L 33/12* (2013.01); *C08F 220/14* (2013.01); *C08F 2/001* (2013.01); *C08L 2203/30* (2013.01); *C08L 2205/025* (2013.01); *C08L 2205/06* (2013.01)

(58) Field of Classification Search
CPC combination set(s) only.
See application file for complete search history.

(56) References Cited

U.S. PATENT DOCUMENTS

| | | | |
|---|---|---|---|
| 2008/0255295 A1 | 10/2008 | Fraser et al. | |
| 2009/0239050 A1 | 9/2009 | Azuma et al. | |
| 2012/0196127 A1 | 8/2012 | Murakami | |
| 2016/0185884 A1 | 6/2016 | Yamamori et al. | |
| 2016/0215082 A1 | 7/2016 | Wake et al. | |
| 2016/0264771 A1* | 9/2016 | Watanabe | C08L 33/08 |
| 2017/0190896 A1* | 7/2017 | Yamamori | C08F 220/14 |

FOREIGN PATENT DOCUMENTS

| | | |
|---|---|---|
| CN | 102675487 A | 9/2012 |
| CN | 104955853 A | 9/2015 |
| CN | 105518040 A | 4/2016 |
| EP | 2500363 A1 | 9/2012 |
| JP | H9-208789 A | 8/1997 |
| JP | 2006193647 A | 7/2006 |
| JP | 2008538794 A | 11/2008 |
| JP | 2011025458 A | 2/2011 |
| JP | 2011168683 A | 9/2011 |
| JP | 2012012564 A | 1/2012 |
| JP | 2012207203 A | 10/2012 |
| JP | 2012214618 A | 11/2012 |
| JP | 2014108988 A | 6/2014 |
| WO | 2007060891 A2 | 5/2007 |
| WO | 2011049203 A1 | 4/2011 |
| WO | 2014088082 A1 | 6/2014 |
| WO | 2015199038 A1 | 12/2015 |

OTHER PUBLICATIONS

English Translation of International Search Report dated Dec. 26, 2017 in International Application No. PCT/JP2017/034434.
Int'l Preliminary Report on Patentability dated Apr. 18, 2019 in Int'l Application No. PCT/JP2017/034434.
Office Action dated Sep. 27, 2020 in CN Application No. 201780060976.X.
Extended European Search Report dated Apr. 2, 2020 in EP Application No. 17858232.6.
Third Party Submission issued Dec. 22, 2020 in JP Application No. 2018543843.
Office Action dated Oct. 12, 2020 in EP Application No. 17858232.6.
Office Action dated Jun. 7, 2021 in EP Application No. 17858232.6.
Office Action dated Jun. 1, 2021 in JP Application No. 2018543843.

* cited by examiner

*Primary Examiner* — Marc S Zimmer
(74) *Attorney, Agent, or Firm* — Panitch Schwarze Belisario & Nadel LLP

(57) ABSTRACT

A methacrylic resin composition is provided which contains at least one methacrylic resin and satisfies conditions (I), (II), and (III) in a differential molecular weight distribution curve. (I) When a proportion (%) of a peak area from a starting point to a molecular weight of 30000 with respect to a peak area from the starting point to an end point is represented by W1, W1 satisfies $18 \leq W1 \leq 27$. (II) When a proportion (%) of a peak area from the starting point to a molecular weight of 80000 with respect to the peak area from the starting point to the end point is represented by W2, W2 satisfies $41 \leq W2 \leq 52$. (III) When a proportion (%) of a peak area from a molecular weight of 300000 to the end point with respect to the peak area from the starting point to the end point is represented by W3, W3 satisfies $10 \leq W3 \leq 14$.

6 Claims, 8 Drawing Sheets

METHACRYLIC RESIN COMPOSITION AND MOLDED OBJECT THEREOF

CROSS-REFERENCE TO RELATED APPLICATION

This application is a Section 371 of International Application No. PCT/JP2017/034434, filed Sep. 25, 2017, which was published in the Japanese language on Apr. 12, 2018 under International Publication No. WO 2018/066393 A1, and claims priority under 35 U.S.C. § 119(b) to Japanese Application No. 2016-196269, filed Oct. 4, 2016, the disclosures of which are incorporated herein by reference in their entirety.

TECHNICAL FIELD

The present invention relates to a methacrylic resin composition and a molded object thereof.

BACKGROUND ART

A methacrylic resin composition is excellent in transparency and weather resistance, and accordingly is used as a material for molding of a member which is particularly used for applications of vehicles for automobiles (hereinafter referred to as "member for vehicle"), for example, such as a tail lamp cover, a head lamp cover, and a cover of a meter panel.

In recent years, a thin-walled molded object has been demanded for the member for a vehicle so as to improve fuel economy. In addition, a demand for upsizing of the member for a vehicle has increased. By upsizing the member for a vehicle, when the member is the tail lamp cover or the head lamp cover, it becomes possible to devise the arrangement of a light source unit, and a width of a design is expanded; and by increasing the number of light sources to lighten wholly in an upsized light unit, it becomes possible to further improve the forward and rearward visibility.

In addition, in the member for a vehicle, a wax remover is occasionally used, and depending on the vehicle, a lamp cover portion or the like is also occasionally subjected to painting or the like. Thus, there are many opportunities for the member for a vehicle to be exposed to an organic solvent or the like, and it is also demanded not to cause crazing or cracking due to such a solvent (where such performance is referred to as "solvent resistance").

In addition, in the case where the member for a vehicle after having been molded is joined to another resin member, in an assembling process of the tail lamp, it is also required not to produce a resin thread upon hot platen welding of these members (where such performance is referred to as "stringing resistance").

At the time when the methacrylic resin composition is subjected to molding processing, the composition is required to be excellent in fluidity at the time of processing. Particularly in the case where an upsized thin-walled molded object which has been demanded in recent years is molded, the fluidity of the resin is insufficient, and accordingly the viscosity of the resin composition must be lowered at the time of melting; and it is necessary to raise the molding temperature as compared with the condition at the time of the conventional processing to process the resin composition, accordingly there arises such a problem that an appearance defect referred to as "silver streak" occurs, and it is required that the resin composition is excellent in the fluidity.

In order to solve such a problem, it is described in Patent Literature 1 and 2 that methacrylic resin compositions are used which contain a methacrylic resin having a high molecular weight and a methacrylic resin having a low molecular weight.

CITATION LIST

Patent Literature

Patent Literature 1: Japanese Unexamined Patent Publication No. 2012-12564
Patent Literature 2: Japanese Unexamined Patent Publication No. 2006-193647

SUMMARY OF INVENTION

Technical Problem

However, the solvent resistance, stringing resistance and fluidity of the methacrylic resin compositions described in the above described patent documents were not satisfactory.

In addition, it is important for the member for a vehicle not to be broken or damaged by an external stress during running, and accordingly high surface impact resistance is required. However, the methacrylic resin compositions described in the above described patent documents were not satisfactory in terms of the surface impact resistance, either.

Accordingly, an object of the present invention is to provide a methacrylic resin composition that can provide a molded object excellent in all of the solvent resistance, the surface impact resistance and the stringing resistance, and that is excellent in the fluidity; and to provide a molded object thereof.

Solution to Problem

The present inventors have made an extensive investigation so as to solve the above described problems, and as a result, have arrived at accomplishing the present invention.

Accordingly, the present invention provides the following inventions, but is not limited to the following description.

[1]
A methacrylic resin composition comprising at least one methacrylic resin and satisfying the following conditions (I), (II) and (III).

(I) When a proportion (%) of a peak area from a starting point to a molecular weight of 30000 with respect to a peak area from the starting point to an end point in a differential molecular weight distribution curve of the methacrylic resin composition is represented by W1, a value of the W1 satisfies an expression: $18 \leq W1 \leq 27$;

(II) when a proportion (%) of a peak area from the starting point to a molecular weight of 80000 with respect to the peak area from the starting point to the end point in the differential molecular weight distribution curve of the methacrylic resin composition is represented by W2, a value of the W2 satisfies an expression: $41 \leq W2 \leq 52$; and (III) when a proportion (%) of a peak area from a molecular weight of 300000 to the end point with respect to the peak area from the starting point to the end point in the differential molecular weight distribution curve of the methacrylic resin composition is represented by W3, a value of the W3 satisfies an expression: $10 \leq W3 \leq 14$.

[2]
The methacrylic resin composition according to [1], wherein the methacrylic resin has a monomer unit derived from an alkyl methacrylate, and a content of the monomer unit derived from an alkyl methacrylate is 98.4 wt % or more with respect to 100 wt % of all monomer units contained in the methacrylic resin.

[3]

The methacrylic resin composition according to [1] or [2], wherein the methacrylic resin composition comprises three or more methacrylic resins having different weight average molecular weights from each other, as the at least one methacrylic resin.

[4]

The methacrylic resin composition according to any one of [1] to [3], wherein the methacrylic resin composition comprises a methacrylic resin having a weight average molecular weight of more than 180000 and 300000 or less; a methacrylic resin having a weight average molecular weight of 5000 or more and less than 70000; and a methacrylic resin having a weight average molecular weight of 70000 or more and 180000 or less, as the at least one methacrylic resin.

[5]

The methacrylic resin composition according to any one of [1] to [3], wherein the methacrylic resin composition comprises a methacrylic resin mixture including two methacrylic resins having mutually different peak molecular weights and satisfying the following conditions (IV), (V) and (VI); and a methacrylic resin having a weight average molecular weight of 70000 or more and 180000 or less, as the at least one methacrylic resin.

(IV) When a highest peak molecular weight among peak molecular weights in a differential molecular weight distribution curve of the methacrylic resin mixture is represented by HP, a value of the HP satisfies an expression: $180000 \leq HP \leq 220000$;

(V) when a peak molecular weight lower than the HP among the peak molecular weights in the differential molecular weight distribution curve of the methacrylic resin mixture is represented by LP, a value of the LP satisfies an expression: $24000 \leq LP \leq 35000$; and (VI) when a value indicating the height of the peak at the HP is represented by (a) and a value indicating the height of the peak at the LP is represented by (b) in the differential molecular weight distribution curve of the methacrylic resin mixture, a value of PR represented by the (a)/(b) satisfies an expression: $1.32 \leq PR \leq 1.60$.

[6]

A molded object comprising the methacrylic resin composition according to any one of [1] to [5].

[7]

A member for a vehicle comprising the methacrylic resin composition according to any one of [1] to [5].

Advantageous Effects of Invention

According to the present invention, there is provided a methacrylic resin composition which can provide a molded object excellent in all of solvent resistance, surface impact resistance and stringing resistance, and is excellent in fluidity; and a molded object thereof.

DESCRIPTION OF EMBODIMENTS

Figure 1:
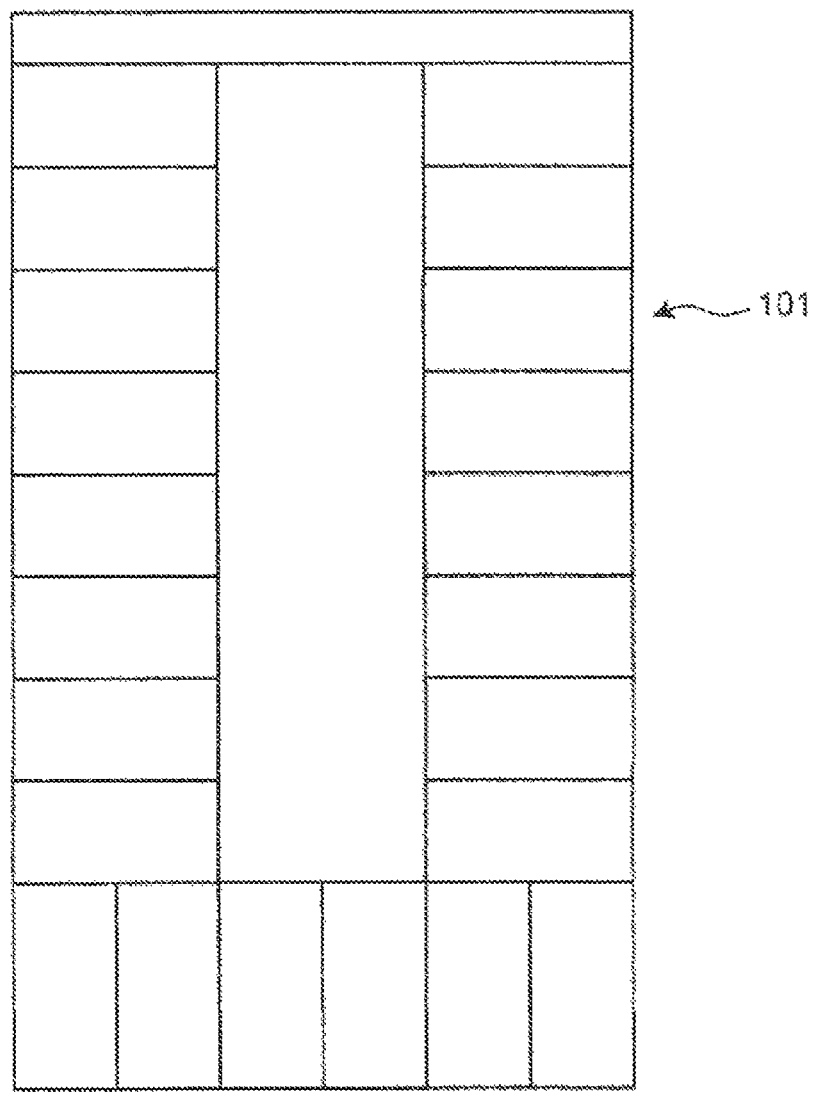
FIG. 1 shows a test piece (before being cut) to be used in an evaluation test for stringing resistance.

In the present specification, a numerical range "A to B" means "A or more and B or less", unless otherwise specified.

A methacrylic resin composition of the present invention is a composition that includes at least one methacrylic resin, and satisfies the following conditions (I), (II) and (III).

(I) When a proportion (%) of a peak area from a starting point to a molecular weight of 30000 with respect to a peak area from the starting point to an end point in a differential molecular weight distribution curve of the methacrylic resin composition is represented by W1, a value of the W1 satisfies an expression: $18 \leq W1 \leq 27$;

(II) when a proportion (%) of a peak area from the starting point to a molecular weight of 80000 with respect to the peak area from the starting point to the end point in the differential molecular weight distribution curve of the methacrylic resin composition is represented by W2, a value of the W2 satisfies an expression: $41 \leq W2 \leq 52$; and (III) when a proportion (%) of a peak area from a molecular weight of 300000 to the end point with respect to the peak area from the starting point to the end point in the differential molecular weight distribution curve of the methacrylic resin composition is represented by W3, a value of the W3 satisfies an expression: $10 \leq W3 \leq 14$.

By satisfying all of the above described conditions (I), (II) and (III), the methacrylic resin composition of the present invention can keep all of solvent resistance, surface impact resistance, stringing resistance and fluidity, which will be described in detail below (particularly, in Examples), at desired levels.

The W1, W2 and W3 in the above described conditions (I), (II) and (III) can be determined according to JIS K 7252-1 to 4 (Determination of average molecular weight and molecular weight distribution of polymer by plastic-size exclusion chromatography—Part 1 to Part 4) with the use of conventionally known size exclusion chromatography (SEC) such as gel permeation chromatography (GPC).

More specifically, firstly, a calibration curve ( ) indicating a correlation between an elution time (T) and a logarithm (log M) of a molecular weight (M) is prepared in advance, with the use of a monodispersed molecular weight standard substance (standard substance of which molecular weight such as number average molecular weight and mass average molecular weight are known and of which molecular weight distribution is narrow) of a commercially available methacrylic resin.

Next, a sample of the methacrylic resin composition which becomes a measuring object is dissolved in an appropriate solvent, and a dilute solution is prepared. This solution is injected into a mobile phase (eluent), and is introduced into a SEC column. In addition, this SEC column is filled with non-adsorptive fine particles having pores of a uniform size, or pores of various sizes. The sample can be mutually separated by differences in molecular weights (hydrodynamic volume) as the sample passes through thus formed SEC column. In this SEC column, a methacrylic resin of which the molecular weight is large cannot pervade the pores, and accordingly more quickly elutes. On the other hand, the methacrylic resin of which the molecular weight is small can pervade the pores, and accordingly the elution becomes slow. Then, a concentration detector continuously detects concentrations of the methacrylic resin in the eluent, and an SEC chromatogram is obtained.

Here, a molecular weight (M) of the methacrylic resin corresponding to an arbitrary elution time (t) in the SEC chromatogram is determined from a calibration curve prepared in advance with the use of a monodispersed molecular weight standard substance.

On the basis of the data obtained above, a "differential molecular weight distribution curve" is prepared by plotting dW/d(log M) with respect to the molecular weight (M) of the methacrylic resin. The "W" represents a concentration fraction.

More specifically, the differential molecular weight distribution curve can be prepared by plotting $dW_i/d(\log M_i)$ which has been calculated from the molecular weight ($M_i$) of the methacrylic resin at each elution time ($t_i$) and a signal intensity ($H_i$) thereof according to the following expression, with respect to the molecular weight ($M_i$) of the methacrylic resin.

$$\Delta W_i = \frac{H_i}{\sum_{i=1}^{n} H_i} \quad \text{[Expression 1]}$$

$$w_i = \Delta W_i \times \frac{1}{I}$$

$$\frac{dW_i}{d(\log M_i)} = -w_i \times \frac{dt_i}{d(\log M_i)}$$

In the Expression 1, I represents a data collection interval (minutes).

Figure 8:
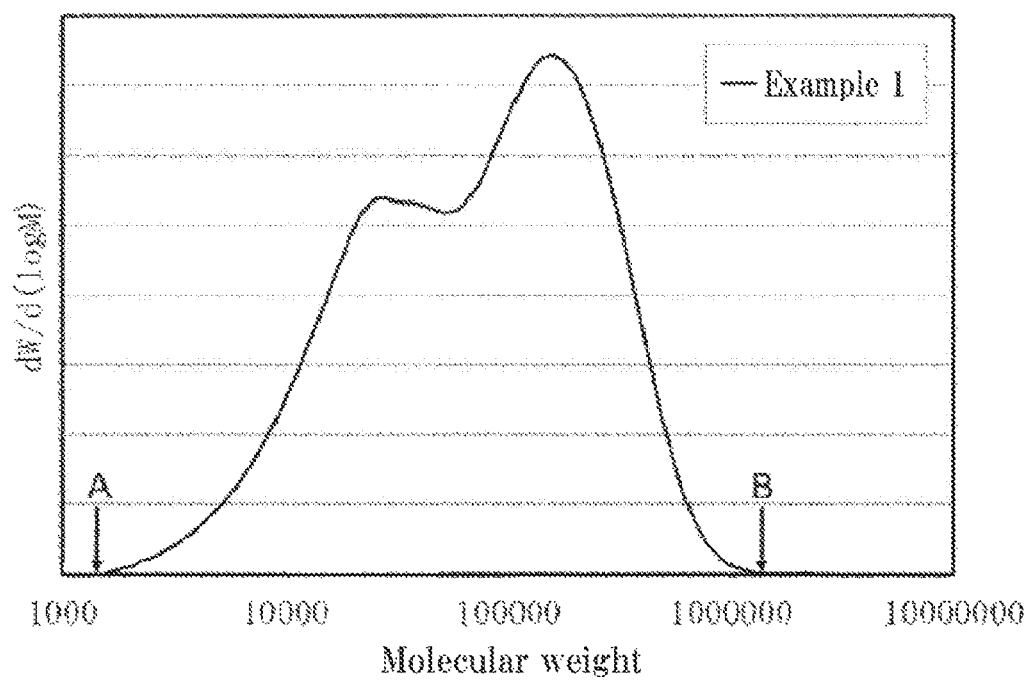
FIG. 8 shows a graph showing a differential molecular weight distribution curve of a methacrylic resin composition of Example 1.

As an example of the differential molecular weight distribution curve prepared in the above description, the differential molecular weight distribution curve of the methacrylic resin composition of Example 1 shown in FIG. 8 will be referred. As shown in FIG. 8, when among points at which the differential molecular weight distribution curve intersects with a straight line of dW/d(log M)=0, a point in a low molecular weight side is represented by point (A) (starting point) and a point in a high molecular weight side is represented by point (B) (end point); and when an area which is surrounded by a curve line from the starting point to the end point and the above described straight line (in the present specification, referred to as peak area) is supposed to be 100, a proportion (%) of a peak area from the starting point to the molecular weight of 30000 with respect to the peak area from the starting point to the end point is represented by "W1", a proportion (%) of the peak area from the starting point to the molecular weight of 80000 is represented by "W2", and a proportion (%) of the area from the molecular weight of 300000 to the end point is represented by W3.

As specified in the above conditions (I) to (III), in the present invention, by setting the respective values of "W1", "W2" and "W3" within predetermined ranges, the above described effect can be obtained.

More specifically, as specified in the condition (I), the value of "W1" is 18 to 27, and it is preferable to be 20 to 26, is more preferable to be 23 to 26, and is further preferable to be 24 to 26. If the value of the W1 is higher than 27, there is a possibility that the surface impact resistance decreases. If the value of the W1 is lower than 18, there is a possibility that the fluidity and the solvent resistance decrease.

As specified in the condition (II), the value of "W2" is 41 to 52, and it is preferable to be 43 to 50, is more preferable to be 44 to 50, and is further preferable to be 48 to 50. If the value of the W2 is higher than 52, there is a possibility that the stringing resistance and the solvent resistance decrease. If the value of the W2 is lower than 41, there is a possibility that the fluidity decreases.

As specified in the condition (II), the value of "W3" is 10 to 14, and it is preferable to be 10 to 13, and it is more preferable to be 10 to 11. If the value of the W3 is higher than 14, there is a possibility that the fluidity decreases. If the value of the W3 is lower than 10, there is a possibility that the stringing resistance and the solvent resistance decrease.

The methacrylic resin composition of the present invention includes at least one methacrylic resin. In the present specification, matters relating to the "methacrylic resin" are applicable to all methacrylic resins included in the methacrylic resin composition of the present invention, unless otherwise specified.

The methacrylic resin has monomer units derived from alkyl methacrylates (hereinafter occasionally referred to as alkyl methacrylate unit). Examples of the alkyl methacrylates include methyl methacrylate, ethyl methacrylate, 2-ethylhexyl methacrylate, lauryl methacrylate, benzyl methacrylate, and cyclohexyl methacrylate; and methyl methacrylate is preferable. These alkyl methacrylates may be used alone, or in a form of a mixture of two or more types thereof.

It is preferable for the content of the alkyl methacrylate unit to be 98.4 wt % or more, is more preferable to be 98.4 to 99.1 wt %, and is further preferable to be 98.5 to 98.8 wt %, with respect to 100 wt % of all monomer units contained in the methacrylic resin. Incidentally, such content can be determined by an analysis using, for example, thermal decomposition gas chromatography or the like.

Here, when the methacrylic resin composition of the present invention includes two or more methacrylic resins, the "content of alkyl methacrylate units" in the present specification does not mean the amount of the alkyl methacrylate units contained in each of the methacrylic resins, but means a total of the contents of the alkyl methacrylate units contained in each of the methacrylic resins; and "100 wt % of all monomer units" does not mean that the content of all monomer units contained in each of the methacrylic resins is assumed to be 100 wt %, but means that a total amount of all monomer units contained in each of the methacrylic resins is assumed to be 100 wt %.

The methacrylic resin may further include other monomer units except the alkyl methacrylate unit, and may include, for example, a monomer unit derived from an acrylic acid ester (hereinafter occasionally referred to as acrylic acid ester unit).

Examples of the acrylic acid ester include methyl acrylate, ethyl acrylate, propyl acrylate, n-butyl acrylate, sec-butyl acrylate, tert-butyl acrylate, cyclohexyl acrylate, benzyl acrylate, 2-ethylhexyl acrylate, 2-hydroxyethyl acrylate and cyclopentadiene acrylate; and methyl acrylate or ethyl acrylate is preferable. These acrylic acid esters may be used alone, or in a form of a mixture of two or more types thereof.

It is preferable for the content of the above described acrylic acid ester unit which can be contained in the methacrylic resin to be 0 to 1.6 wt %, is more preferable to be 0.9 to 1.6 wt %/o, and is further preferable to be 1.2 to 1.5 wt %. Here, it is assumed that the total of the alkyl methacrylate unit and the acrylic acid ester unit is 100 wt %. Incidentally, such content can be determined by an analysis using, for example, thermal decomposition gas chromatography or the like.

Here, when the methacrylic resin composition of the present invention includes two or more methacrylic resins, the "content of alkyl methacrylate unit" in the present specification does not mean the amount of the alkyl methacrylate unit contained in each of the methacrylic resins, but means the total of the contents of the alkyl methacrylate units contained in each of the methacrylic resins.

When the content of the acrylic acid ester unit is outside the above described range, there is a possibility that depolymerization of the obtained copolymer proceeds, and thermal stability during injection molding decreases. When a weight ratio of the acrylic acid ester unit exceeds 1.6 wt %, there is a possibility that the heat resistance (Vicat softening point and the like which will be described later) of a molded component such as a vehicle member to be obtained decreases.

Here, a conventionally known analytical method can be adopted for the analysis by the above described thermal decomposition gas chromatography or the like.

For example, the content can be determined by an operation of: thermally decomposing the methacrylic resin composition of the present invention in a thermal decomposition furnace at a predetermined temperature (400° C. or higher); analyzing a generated decomposition gas by gas chromatography; determining an area ratio of the peak corresponding to each monomer component constituting the above described methacrylic resin; and converting the area ratio to the weight proportion (%).

As for a method of converting the area ratio to the weight proportion (%), it is possible, for example, to previously determine an area ratio of a peak corresponding to each monomer component, on a standard preparation of the methacrylic resin (which is available as commercially available product, and of which the type of monomer components and weight ratio are known) in a similar way to the above description; thereby calculate a factor which can convert such area ratio to the weight proportion (%) of the monomer component; further prepare a calibration curve with the use of a plurality of standard preparations, as needed, and calculate such factors; and convert an area ratio of a monomer component of the methacrylic resin contained in the methacrylic resin composition of the present invention to a corresponding weight proportion (%) with the use of such factors. Incidentally, when these peaks partially overlap each other, it is also possible to correct the overlapping area by a conventionally known method, and calculate the above described ratio.

In addition to the alkyl methacrylates and the acrylic acid esters, other monomers copolymerizable with alkyl methacrylates and/or acrylic acid esters may be included as the above described monomer component. Examples of such other monomers include a monofunctional monomer having one radically polymerizable double bond, and a polyfunctional monomer having two or more radically polymerizable double bonds; and these monomers may be used singly or in a form of a mixture or two or more types thereof.

Examples of the monofunctional monomers include methacrylic acid esters such as ethyl methacrylate, propyl methacrylate, n-butyl methacrylate, sec-butyl methacrylate, tert-butyl methacrylate, 2-ethylhexyl methacrylate, cyclohexyl methacrylate, benzyl methacrylate and cyclopentadiene methacrylate; unsaturated carboxylic acids such as acrylic acid, methacrylic acid, maleic acid, itaconic acid, maleic anhydride and itaconic anhydride, or anhydrides thereof; nitrogen-containing monomers such as acrylamide, methacrylamide, acrylonitrile and methacrylonitrile; and styrene monomers such as styrene and α-methylstyrene.

Examples of the polyfunctional monomers include unsaturated dicarboxylic acid esters of glycols, such as ethylene glycol dimethacrylate and butanediol dimethacrylate; alkenyl esters of unsaturated carboxylic acids, such as allyl acrylate, allyl methacrylate and allyl cinnamate; alkenyl esters of polybasic acids, such as diallyl phthalate, diallyl maleate, triallyl cyanurate and triallyl isocyanurate; unsaturated carboxylic acid esters of polyhydric alcohols, such as trimethylolpropane triacrylate; and divinylbenzene.

Examples of a method for polymerizing a monomer component such as the above described alkyl methacrylate and other monomers to produce a methacrylic resin include known polymerization methods such as a suspension polymerization method, a solution polymerization method, and a bulk polymerization method; and a preferable method is the bulk polymerization method.

The bulk polymerization method does not use a polymerization stabilizer, and accordingly can provide a methacrylic resin excellent in appearance. In addition, unlike the case of suspension polymerization, the polymerization temperature is higher than 100° C.; and as a result, the syndiotacticity of the methacrylic resin tends to easily decrease, and accordingly the fluidity of the methacrylic resin further increases. Furthermore, in the case where the bulk polymerization is continuously performed, it is possible to perform the bulk polymerization, for example, by continuously extracting a partial polymer which is obtained by making the above described monomer component and, as needed, a polymerization initiator, a chain transfer agent or the like stay in a reaction vessel for a predetermined time period, while continuously supplying the above substances into the reaction vessel, and accordingly it is possible to obtain the methacrylic resin with high productivity.

In the production of the methacrylic resin contained in the methacrylic resin composition of the present invention, the polymerization temperature is preferably 110 to 175° C.

In the above described method for producing the methacrylic resin, in particular, in the bulk polymerization, a polymerization initiator or a chain transfer agent, for example, may be used. For example, a radical initiator can be used as the polymerization initiator.

Examples of the radical initiator include: azo compounds such as azobisisobutyronitrile, azobisdimethylvaleronitrile, azobiscyclohexanenitrile, 1,1'-azobis(1-acetoxy-1-phenylethane), dimethyl 2,2'-azobisisobutyrate and 4,4'-azobis-4-cyanovaleric acid; and organic peroxides such as benzoyl peroxide, lauroyl peroxide, acetyl peroxide, caprylyl peroxide, 2,4-dichlorobenzoyl peroxide, isobutyl peroxide, acetyl cyclohexyl sulfonyl peroxide, t-butyl peroxypivalate, t-butyl peroxyneodecanoate, t-butyl peroxyneoheptanoate, t-butyl peroxy-2-ethylhexanoate, 1,1-di(t-butylperoxy)cyclohexane, 1,1-di(t-butylperoxy)-3,3,5-trimethylcyclohexane, 1,1-di(t-hexylperoxy)-3,3,5-trimethylcyclohexane, diisopropyl peroxydicarbonate, diisobutyl peroxydicarbonate, di-sec-butyl peroxydicarbonate, di-n-butyl peroxydicarbonate, bis(2-ethylhexyl) peroxydicarbonate, bis(4-t-butylcyclohexyl) peroxydicarbonate, t-amyl peroxy-2-ethylhexanoate, 1,1,3,3-tetramethylbutyl peroxy-ethylhexanoate, 1,1,2-trimethylpropyl peroxy-2-ethylhexanoate, t-butyl peroxyisopropylmonocarbonate, t-amyl peroxyisopropylmonocarbonate, t-butyl peroxy-2-ethylhexylcarbonate, t-butyl peroxyallylcarbonate, t-butyl peroxyisopropylcarbonate, 1,1,3,3-tetramethylbutyl peroxyisopropylmonocarbonate, 1,1,2-trimethylpropyl peroxyisopropylmonocarbonate, 1,1,3,3-tetramethylbutyl peroxy-isononanate, 1,1,2-trimethylpropyl peroxy-isononanate, and t-butyl peroxybenzoate.

These polymerization initiators may be used alone, or in a form of a mixture of two or more types thereof.

The type of the polymerization initiator can be selected according to the types of the methacrylic resin to be produced and a raw material monomer to be used. As for the radical initiator, an initiator is preferable of which the half-life at the polymerization temperature is within 1 minute.

The amount of the polymerization initiator to be used may be adjusted according to a target rate of polymerization, a reaction condition and the like.

The chain transfer agent which can be used in the present invention may be any of monofunctional and polyfunctional chain transfer agents. Specific examples of the chain transfer agent include alkyl mercaptans such as n-propyl mercaptan, isopropyl mercaptan, n-butyl mercaptan, t-butyl mercaptan, n-hexyl mercaptan, n-octyl mercaptan, 2-ethylhexyl mercaptan, n-dodecyl mercaptan and t-dodecyl mercaptan; aromatic mercaptans such as phenyl mercaptan and thiocresol; mercaptans having 18 or less carbon atoms, such as ethylene thioglycol; polyhydric alcohols such as ethylene glycol, neopentyl glycol, trimethylol propane, pentaerythritol, dipentaerythritol, tripentaerythritol and sorbitol; those obtained by esterifying a hydroxyl group with a thioglycolic acid or a 3-mercaptopropionic acid; 1,4-dihydronaphthalene; 1,4,5,8-tetrahydronaphthalene; β-terpinene; terpinolene; 1,4-cyclohexadiene; and hydrogen sulfide. These chain transfer agents may be used alone, or in combinations of two or more types.

The type and the amount to be used of the chain transfer agent can be selected according to the types of the methacrylic resin to be produced and the raw material monomer to be used. As for the chain transfer agent, the n-octyl mercaptan or the n-dodecyl mercaptan is preferable.

In addition to the above described raw material monomer, polymerization initiator, chain transfer agent and the like, a mold release agent, a rubbery polymer such as butadiene and styrene butadiene rubber (SBR), a heat stabilizer and an ultraviolet absorber, for example, may be used.

Here, the mold release agent is an agent used for improving the moldability of the methacrylic resin composition to be obtained. The heat stabilizer is an agent used for suppressing thermal decomposition of the methacrylic resin to be produced. The ultraviolet absorber is an agent used for suppressing a deterioration of the methacrylic resin to be produced due to ultraviolet rays.

The mold release agent is not limited in particular, but examples thereof include higher fatty acid esters, higher aliphatic alcohols, higher fatty acids, higher fatty acid amides, and higher fatty acid metal salts. Incidentally, the mold release agents may be used alone, or in combinations of two or more types.

Specific examples of the higher fatty acid esters include: saturated fatty acid alkyl esters such as methyl laurate, ethyl laurate, propyl laurate, butyl laurate, octyl laurate, methyl palmitate, ethyl palmitate, propyl palmitate, butyl palmitate, octyl palmitate, methyl stearate, ethyl stearate, propyl stearate, butyl stearate, octyl stearate, stearyl stearate, myristyl myristate, methyl behenate, ethyl behenate, propyl behenate, butyl behenate and octyl behenate; unsaturated fatty acid alkyl esters such as methyl oleate, ethyl oleate, propyl oleate, butyl oleate, octyl oleate, methyl linoleate, ethyl linoleate, propyl linoleate, butyl linoleate and octyl linoleate; saturated fatty acid glycerides such as lauric acid monoglyceride, lauric acid diglyceride, lauric acid triglyceride, palmitic acid monoglyceride, palmitic acid diglyceride, palmitic acid triglyceride, stearic acid monoglyceride, stearic acid diglyceride, stearic acid triglyceride, behenic acid monoglyceride, behenic acid diglyceride and behenic acid triglyceride; and unsaturated fatty acid glycerides such as oleic acid monoglyceride, oleic acid diglyceride, oleic acid triglyceride, linoleic acid monoglyceride, linoleic acid diglyceride and linoleic acid triglyceride. Among these, methyl stearate, ethyl stearate, butyl stearate, octyl stearate, stearic acid monoglyceride, stearic acid diglyceride, stearic acid triglyceride and the like are preferable.

Specific examples of the higher aliphatic alcohols include: saturated aliphatic alcohols such as lauryl alcohol, palmityl alcohol, stearyl alcohol, isostearyl alcohol, behenyl alcohol, myristyl alcohol and cetyl alcohol; and unsaturated aliphatic alcohols such as oleyl alcohol and linoleyl alcohol. Among these, stearyl alcohol is preferable.

Specific examples of the higher fatty acids include: saturated fatty acids such as caproic acid, caprylic acid, capric acid, lauric acid, myristic acid, palmitic acid, stearic acid, arachidic acid, behenic acid, lignoceric acid and 12-hydroxyoctadecanoic acid; and unsaturated fatty acids such as palmitoleic acid, oleic acid, linoleic acid, linolenic acid, cetoleic acid, erucic acid and ricinoleic acid.

Specific examples of the higher fatty acid amides include: saturated fatty acid amides such as lauric acid amide, palmitic acid amide, stearic acid amide and behenic acid amide; unsaturated fatty acid amides such as oleic acid amide, linoleic acid amide and erucic acid amide; and amides such as ethylenebis lauric acid amide, ethylenebis palmitic acid amide, ethylenebis stearic acid amide and N-oleyl stearamide. Among these, stearic acid amide and ethylenebis stearic acid amide are preferable.

Examples of the higher fatty acid metal salts include, for example, sodium salts, potassium salts, calcium salts, barium salts and the like of the above described higher fatty acids.

It is preferable for the amount of the mold release agent to be used to be adjusted so as to become 0.01 to 1.0 parts by weight, and is more preferable to be adjusted so as to become 0.01 to 0.50 parts by weight, with respect to 100 parts by weight of the methacrylic resin. In the case where the methacrylic resin composition of the present invention includes two or more methacrylic resins, in the present specification, "100 parts by weight of methacrylic resin" means that the total amount of the plurality of methacrylic resins is assumed to be 100 parts by weight.

The heat stabilizer is not limited in particular, but examples thereof include hindered phenol-based heat stabilizers, phosphorus-based heat stabilizers and organic disulfide compounds. Among these, the organic disulfide compounds are preferable. Incidentally, the heat stabilizers may be used alone, or in combinations of two or more types.

Examples of the hindered phenol-based heat stabilizers include 1,3,5-tris(3,5-di-tert-butyl-4-hydroxybenzyl)-1,3,5-triazine-2,4,6(1H,3H,5H)-trione, octadecyl 3-(3,5-di-tert-butyl-4-hydroxyphenyl) propionate, pentaerythritol tetrakis [3-(3,5-di-tert-butyl-4-hydroxyphenyl) propionate], 3,9-bis{2-[3-(3-tert-butyl-4-hydroxy-5-methylphenyl)

propionyloxy]-1,1-dimethylethyl}-2,4,8,10-tetraoxaspiro [5.5]undecane, and 1,3,5-tris(3,5-di-tert-butyl-4-hydroxyphenylmethyl)-2,4,6-trimethylbenz ene. Among these, octadecyl 3-(3,5-di-tert-butyl-4-hydroxyphenyl) propionate, and pentaerythritol tetrakis[3-(3,5-di-tert-butyl-4-hydroxyphenyl) propionate] are preferable.

Examples of the phosphorus-based heat stabilizers include tris(2,4-di-t-butylphenyl)phosphite, 2-[[2,4,8,10-tetrakis(1,1-dimethylethyl) dibenzo[d,f][1,3,2]dioxaphosphepin-6-yl]oxy]-N,N-bis[2-[[2,4,8,10-tetrakis(1,1-dimethylethyl) dibenzo[d,f][1,3,2] dioxaphosphepin-6-yl]oxy]ethyl] ethanamine, diphenyl tridecyl phosphite, triphenyl phosphite, 2,2-methylenebis(4,6-di-tert-butylphenyl)octyl phosphite, and bis(2,6-di-tert-butyl-4-methylphenyl)pentaerythritol diphosphite. Among these, 2,2-methylenebis(4,6-di-tert-butylphenyl)octyl phosphite is preferable.

Examples of the organic disulfide compounds include dimethyl disulfide, diethyl disulfide, di-n-propyl disulfide, di-n-butyl disulfide, di-sec-butyl disulfide, di-tert-butyl disulfide, di-tert-amyl disulfide, dicyclohexyl disulfide, di-tert-octyl disulfide, di-n-dodecyl disulfide and di-tert-dodecyl disulfide. Among these, di-tert-alkyl disulfide is preferable, and di-tert-dodecyl disulfide is further preferable.

It is preferable for the amount of the heat stabilizer to be used to be 1 to 2000 ppm by weight with respect to 100 parts by weight of the methacrylic resin. When the methacrylic resin composition (more specifically, methacrylic resin composition after devolatilization) is molded, in order to obtain a molded object from the methacrylic resin composition of the present invention, there is a case where the molding temperature is set to be high for the purpose of enhancing molding efficiency. In such a case, it is more effective to blend a heat stabilizer.

Examples of the types of ultraviolet absorbers include a benzophenone-based ultraviolet absorber, a cyanoacrylate-based ultraviolet absorber, a benzotriazole-based ultraviolet absorber, a malonic acid ester-based ultraviolet absorber and an oxalanilide-based ultraviolet absorber. The ultraviolet absorbers may be used alone, or in combinations of two or more types. Among those, the benzotriazole-based ultraviolet absorber, the malonic acid ester-based ultraviolet absorber and the oxalanilide-based ultraviolet absorber are preferable.

Examples of the benzophenone-based ultraviolet absorbers include 2,4-dihydroxybenzophenone, 2-hydroxy-4-methoxybenzophenone, 2-hydroxy-4-methoxybenzophenone-5-sulfonate, 2-hydroxy-4-octyloxybenzophenone, 4-dodecyloxy-2-hydroxybenzophenone, 4-benzyloxy-2-hydroxybenzophenone and 2,2'-dihydroxy-4,4'-dimethoxybenzophenone.

Examples of the cyanoacrylate-based ultraviolet absorbers include ethyl 2-cyano-3,3-diphenylacrylate and 2-ethylhexyl 2-cyano-3,3-diphenylacrylate.

Examples of the benzotriazole-based ultraviolet absorbers include 2-(2-hydroxy-5-methylphenyl)-2H-benzotriazole, 5-chloro-2-(3,5-di-t-butyl-2-hydroxyphenyl)-2H-benzotriazole, 2-(3-t-butyl-2-hydroxy-5-methylphenyl)-5-chloro-2H-benzotriazole, 2-(3,5-di-t-pentyl-2-hydroxyphenyl)-2H-benzotriazole, 2-(3,5-di-t-butyl-2-hydroxyphenyl)-2H-benzotriazole, 2-(2H-benzotriazol-2-yl)-4-methyl-6-(3,4,5,6-tetrahydrophthalimidylmethyl) phenol, and 2-(2-hydroxy-5-t-octylphenyl)-2H-benzotriazole.

As the malonic acid ester-based ultraviolet absorbers, 2-(1-arylalkylidene) malonic acid esters are usually used, and examples thereof include dimethyl 2-(paramethoxybenzylidene) malonate.

As the oxalanilide-based ultraviolet absorbers, 2-alkoxy-2'-alkyl oxalanilides are usually used, and examples thereof include 2-ethoxy-2'-ethyl oxalanilide.

It is preferable for the amount of the ultraviolet absorber to be used to be 5 to 1000 ppm by weight with respect to 100 parts by weight of the methacrylic resin contained in the methacrylic resin composition to be obtained.

As for the methacrylic resin composition of the present invention, the composition is preferable that includes three or more methacrylic resins having different weight average molecular weights from each other, from the viewpoints of the solvent resistance, the surface impact resistance, the stringing resistance and the fluidity; the composition is more preferable that includes a methacrylic resin (A) having a weight average molecular weight of more than 180000 and 300000 or less, a methacrylic resin (B) having a weight average molecular weight of 5000 or more and less than 70000, and a methacrylic resin (C) having a weight average molecular weight of 70000 or more and 180000 or less; the composition is further preferable that includes a methacrylic resin mixture containing two methacrylic resins selected from the group consisting of the methacrylic resin (A), the methacrylic resin (B) and the methacrylic resin (C), and the remaining one methacrylic resin; and the composition is particularly preferable that includes a methacrylic resin mixture (X) containing the methacrylic resin (A) and the methacrylic resin (B), and the methacrylic resin (C).

Incidentally, the above described three or more methacrylic resins having different weight average molecular weights from each other include: for example, a combination of two methacrylic resins (A) having different weight average molecular weights from each other, and one methacrylic resin (B); a combination of three methacrylic resins (C) having different weight average molecular weights from each other; and a combination of two methacrylic resins (C) having different weight average molecular weights from each other, one methacrylic resin (B), and one methacrylic resin (C).

It is preferable for the weight average molecular weight of the methacrylic resin (A) to be more than 180000 and 230000 or less, and is more preferably to be more than 180000 and 210000 or less. It is preferable for the weight average molecular weight of the methacrylic resin (B) to be 20000 or more and less than 70000, and is more preferably to be 30000 to 60000. It is preferable for the weight average molecular weight of the methacrylic resin (C) to be 70000 to 110000. The methacrylic resin composition of the present invention may include two or more methacrylic resins (A), may include two or more methacrylic resins (B), and may include two or more methacrylic resins (C).

By using the methacrylic resin (A), the methacrylic resin (B) and the methacrylic resin (C) having the weight average molecular weights within the above ranges, it is possible to improve the solvent resistance, surface impact resistance and stringing resistance of the molded object, and to obtain a methacrylic resin composition more excellent in the fluidity.

The method for measuring the above described weight average molecular weight and the method for preparing the above described differential molecular weight distribution curve are similar to the above described methods (methods using SEC) in the method of calculating the W1, the W2 and the W3 in the methacrylic resin composition.

In the case where the methacrylic resin composition of the present invention is a composition including the methacrylic resin (A), the methacrylic resin (B) and the methacrylic resin (C), it is preferable for the content of the methacrylic resin (A) to be 117 parts by weight to 630 parts by weight, and is further preferable to be 150 parts by weight to 280 parts by weight, with respect to 100 parts by weight of the methacrylic resin (C). It is more preferable for the content of the methacrylic resin (B) to be 70 parts by weight to 450 parts by weight, and is further preferable to be 90 parts by weight to 200 parts by weight, with respect to 100 parts by weight of the methacrylic resin (C). By controlling the contents of the methacrylic resin (A) and the methacrylic resin (B) to the above described range, it is possible to improve the solvent resistance, surface impact resistance and stringing resistance of the molded object, and to obtain a methacrylic resin composition more excellent in the fluidity.

It is preferable for the content of the methacrylic resin (A) contained in the methacrylic resin mixture (X) to be 50 to 70 wt %/o, and is more preferable to be 55 to 65 wt %. It is preferable for the content of the methacrylic resin (B) contained in the methacrylic resin mixture (X) to be 30 to 50 wt %, and is more preferable to be 35 to 45 wt %. Here, it is assumed that the total content of the methacrylic resin (A) and the methacrylic resin (B) is 100 wt %. By controlling the contents of the methacrylic resin (A) and the methacrylic resin (B) to the above described range, it is possible to improve the solvent resistance, surface impact resistance and stringing resistance of the molded object, and to obtain a methacrylic resin composition more excellent in the fluidity.

A methacrylic resin mixture containing 50 to 70 wt % of the methacrylic resin (A) and 30 to 50 wt % of the methacrylic resin (B) is preferably a methacrylic resin mixture (Y) which includes two methacrylic resins (methacrylic resin (A) and methacrylic (B)) having mutually different peak molecular weights and satisfies the following conditions (IV), (V) and (VI).

(IV) When a highest peak molecular weight among peak molecular weights in a differential molecular weight distribution curve of the methacrylic resin mixture is represented by HP, a value of the HP satisfies an expression: $180000 \leq HP \leq 220000$;

(V) when a peak molecular weight lower than HP among the peak molecular weights in the differential molecular weight distribution curve of the methacrylic resin mixture is represented by LP, a value of the LP satisfies an expression: $24000 \leq LP \leq 35000$; and (VI) when a value indicating the height of the peak at the HP is represented by (a) and a value indicating the height of the peak at the LP is represented by (b) in the differential molecular weight distribution curve, a value of PR represented by the (a)/(b) satisfies the expression: $1.32 \leq PR \leq 1.60$.

The value of the HP is 180000 to 220000, and it is preferable to be 180000 to 200000. When the value of the HP is higher than 220000, there is a case where the methacrylic resin composition is not excellent in the fluidity. When the value of the IP is lower than 180000, there is a case where the methacrylic resin composition is not excellent in the solvent resistance and the stringing resistance.

The value of the LP is 24000 to 35000, and it is preferable to be 25000 to 28000. When the value of the LP is higher than 35000, there is a case where the methacrylic resin composition is not excellent in the fluidity. When the value of the LP is lower than 24000, there is a case where the methacrylic resin composition is not excellent in the heat resistance and the surface impact strength. In the differential molecular weight distribution curve of the methacrylic resin mixture, when there exist a plurality of peak molecular weights lower than the HP, it is preferable for the second highest peak molecular weight following the HP to be 24000 to 35000, and is more preferable to be 25000 to 28000.

The value of the PR is 1.32 to 1.60, and it is preferable to be 1.35 to 1.40. When the value of the PR is higher than 1.60, there is a case where the methacrylic resin composition is not excellent in the fluidity. When the value of the PR is lower than 1.32, there is a case where the methacrylic resin composition is not excellent in the solvent resistance and the stringing resistance.

Incidentally, a method of preparing the differential molecular weight distribution curve necessary for the calculation of the HP, the LP and the PR is similar to the method described above (method using SEC) in the calculation method of the W1, the W2 and the W3 in the methacrylic resin composition. The peak molecular weight in the differential molecular weight distribution curve is a local maximal molecular weight in the differential molecular weight distribution curve.

The value of the HP can be adjusted by, for example, the content and the molecular weight of the methacrylic resin (A), and the value of the LP can be adjusted by the content and the molecular weight of the methacrylic resin (B). In addition, the value of the PR can be adjusted by, for example, the contents and the molecular weights of the methacrylic resin (A) and the methacrylic resin (B).

When the methacrylic resin composition of the present invention is a composition including a methacrylic resin mixture (Y) and a methacrylic resin (C), it is preferable for the content of the methacrylic resin mixture (Y) to be 70 to 90 wt %, and is more preferable to be 75 to 80 wt %. It is preferable for the content of the methacrylic resin (C) to be 10 to 30 wt %, and is more preferable to be 20 to 25 wt %. By controlling the contents of the methacrylic resin mixture (Y) and the methacrylic resin (C) to the above described range, it is possible to improve the solvent resistance, the surface impact resistance and the stringing resistance of the molded object, and to obtain a methacrylic resin composition more excellent in the fluidity.

In addition, when the methacrylic resin composition of the present invention is a composition including the methacrylic resin mixture (Y) and the methacrylic resin (C), it is preferable that the content of the alkyl methacrylate unit in the methacrylic resin mixture (Y) is 98.5 wt % to 100 wt %, that the content of the acrylic acid ester unit is 0 to 1.5 wt % (provided that total amount of alkyl methacrylate unit and acrylic acid ester unit in methacrylic resin mixture (Y) is 100 wt %), that the content of the alkyl methacrylate unit in the methacrylic resin (C) is 96 to 98 wt %, and that the content of the acrylic acid ester unit is 2 to 4 wt % (provided that total amount of alkyl methacrylate unit and acrylic acid ester unit in methacrylic resin (C) is 100 wt %). By controlling the content of the alkyl methacrylate unit and the acrylic acid ester unit in the methacrylic resin mixture (Y) and the content of the alkyl methacrylate unit and the acrylic acid ester unit in the methacrylic resin (C) to the above described ranges, it is possible to improve the solvent resistance, the surface impact resistance and the stringing resistance of the molded object, and to obtain a methacrylic resin composition more excellent in the fluidity.

Examples of a method for producing the methacrylic resin composition of the present invention include a method of kneading the above described methacrylic resin, and as needed, another arbitrary appropriate component (above described mold release agent, rubbery polymer, heat stabilizer, ultraviolet absorber and the like).

Examples of a method for producing a methacrylic resin composition including three or more methacrylic resins having different weight average molecular weights from each other include: a method of producing three or more methacrylic resins respectively, and then kneading the three or more methacrylic resins; and a method of kneading two methacrylic resins to produce a methacrylic resin mixture, and kneading the methacrylic resin mixture and the remaining methacrylic resin.

Examples of a method for producing the methacrylic resin mixture include: a method of producing two methacrylic resins respectively, and then kneading the resins in an extruder; and a method of polymerizing a monomer component capable of forming one methacrylic resin, in the presence of a composition (syrup) containing the other methacrylic resin out of the two the methacrylic resins, with the use of a multistage polymerization method, and then kneading such syrup in an extruder.

Figure 7:
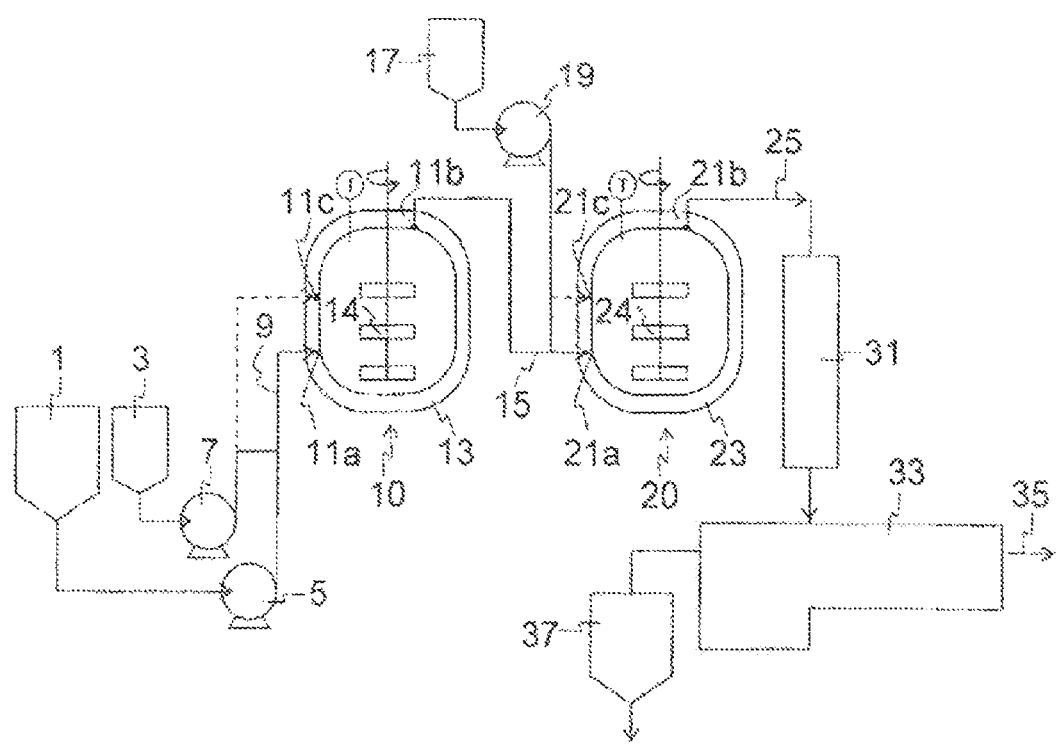
FIG. 7 shows a schematic view showing one example of an apparatus for producing a methacrylic resin composition of the present invention.

Such multistage polymerization includes a method described in International Publication No. WO 2014-088082. As illustrated in FIG. 7, the multistage polymerization is carried out with the use of two reaction tanks, and preferably, continuous bulk polymerization can be carried out in each of the reaction tanks. For example, one of the two methacrylic resins is prepared in the first reaction tank 10, and the other methacrylic resin can be prepared in the presence of one methacrylic resin in the second reaction tank 20.

In a case where the methacrylic resin mixture (Y) is produced by the multistage polymerization, the value of the HP can be adjusted by a concentration of the chain transfer agent, the temperature and the like in the first reaction tank 10. For example, when the concentration of the chain transfer agent is lowered in the first reaction tank 10, there is a tendency that the value of the HP increases, and when the temperature in the first reaction tank 10 is lowered, there is a tendency that the value of the HP increases.

In addition, the value of the LP can be adjusted by the concentration of the chain transfer agent, the temperature and the like in the second reaction tank 20. For example, when the concentration of the chain transfer agent is lowered in the second reaction tank 20, there is a tendency that the value of the LP increases, and when the temperature in the second reaction tank 20 is lowered, there is a tendency that the value of the LP increases.

In addition, the value of the PR can be adjusted by, for example, the rates of polymerization in the first reaction tank 10 and the second reaction tank 20. For example, the value of the PR can be increased by raising the rate of polymerization in the first reaction tank or decreasing the rate of polymerization in the second reaction tank.

The rate of polymerization in each of the reaction tanks can be adjusted by, for example, a concentration of the above described polymerization initiator.

It is preferable for the temperature in the reaction tank in the first reaction tank 10 to be 110 to 160° C., is more preferable to be 110 to 150° C., and is further preferable to be 120 to 140° C. When the temperature in the reaction tank in the first reaction tank 10 is in the above described range, it is preferable that the concentration of the chain transfer agent in the first reaction tank 10 is 0.08 to 0.10 wt %, with respect to the total weight of a raw material monomer to be supplied to the first reaction tank 10.

In the second reaction tank 20, it is preferable for the temperature in the reaction tank to be 170 to 190° C., and is more preferably to be 175 to 185° C. When the temperature in the reaction tank in the second reaction tank 20 is in the above described range, it is preferable that the concentration of the chain transfer agent to be supplied to the second reaction tank 20 is 0.40 to 0.60 wt %, with respect to the total weight of a raw material monomer to be supplied to the second reaction tank 20.

When the LP value deviates from the target range specified in the condition (V), the molecular weight of the LP resin can be adjusted by changing the concentration of the chain transfer agent in the second reaction tank, but when tails of peaks of both the LP resin and the HP resin overlap, the PR value can change somewhat. Because of this, it is desirable to adjust the PR value by firstly adjusting the value of the LP to within the target range, and then adjusting the rate of polymerization.

In the present invention, a methacrylic resin composition can be provided which can provide a molded object excellent in the excellent solvent resistance, heat resistance, surface impact resistance and stringing resistance, and excellent in the fluidity, by satisfying all of the above described conditions (I) to (II). Evaluation criteria for "fluidity", "solvent resistance", "surface impact resistance" and "stringing resistance" will be described in detail in the following examples.

The values of the W1, the W2 and the W3 in the above described conditions (I) to (III) can be adjusted by the weight average molecular weight and content of the methacrylic resin contained in the composition.

When the methacrylic resin composition of the present invention is a composition including the methacrylic resin (A), the methacrylic resin (B) and the methacrylic resin (C), the W1, the W2 and the W3 can be adjusted by each molecular weight, each content and the like of the methacrylic resin (A), the methacrylic resin (B) and the methacrylic resin (C). For example, when the content of the methacrylic resin (C) is increased, there is a tendency that the values of the W1, the W2 and the W3 increase, when the content of the methacrylic resin (A) is increased, there is a tendency that the values of the W2 and the W3 increase, and when the content of the methacrylic resin (B) is increased, there is a tendency that the values of the W1 and the W2 increase; and when the molecular weight of the methacrylic resin (A) is decreased, there is a tendency that the W3 decreases, when the molecular weight of the methacrylic resin (B) is decreased, there is a tendency that the W1 increases, and when the molecular weight of the methacrylic resin (C) is decreased, there is a tendency that the W1 and the W2 increase.

In the case where the methacrylic resin composition of the present invention is a composition including the methacrylic resin mixture (Y) and the methacrylic resin (C), the W1, the W2 and the W3 can be adjusted by the HIP, LP and PR of the methacrylic resin mixture (Y), the content of the methacrylic resin mixture (Y), the molecular weight and content of the methacrylic resin (C), and the like. For example, when the value of the HP is increased, there is a tendency that the value of the W3 increases, when the value of the LP is increased, there is a tendency that the value of the W1 decreases, and when the value of the PR is increased, there is a tendency that the values of the W1 and the W2 decrease and the W3 increases.

The methacrylic resin composition of the present invention is excellent in the solvent resistance, the heat resistance, the surface impact strength and the stringing resistance, and is excellent also in the fluidity, by satisfying all of the above described conditions (I) to (III); accordingly is preferably used for various molded objects including, for examples, members for vehicles such as a tail lamp cover, a head lamp cover, and a cover for a visor and meter panel, optical members such as a lens, a display protection plate, an optical film and a light guide plate, and members for cosmetic containers; and can be particularly preferably used as a material for molding of the members for vehicles, among the members. The molded object consisting of the methacrylic resin composition of the present invention can be produced by methods such as an extrusion molding method, an injection molding method and the like, but because the methacrylic resin composition of the present invention is excellent in the fluidity, it is preferable to be produced by the injection molding method.

EXAMPLES

Hereinafter, the present invention will be described in more detail with reference to examples and comparative examples, but the present invention is not limited to the examples.

Firstly, evaluation methods of "fluidity", "solvent resistance", "surface impact resistance" and "stringing resistance" will be described in detail.

<Evaluation Method of "Fluidity">

An injection molded component was molded by an operation of injecting each of methacrylic resin compositions of the following Examples 1 to 6 and Comparative Examples 2 to 6 or a methacrylic resin mixture of Comparative Example 1 into a circular spiral die from a central part of the die, with the use of an injection molding machine ("Si-180 V CH 450 C model" made by Toyo Machinery & Metal Co., Ltd.); and at this time, reaching distances (mm) (hereinafter also referred to as "spiral flow length" (mm)) of the methacrylic resin compositions (or methacrylic resin mixture) in the die were measured. Incidentally, the reaching distance was determined by an operation of reading a scale transferred from the die to the injection molded component. Here, it is shown that the longer the reaching distance is, the more excellent the fluidity of the methacrylic resin composition (or methacrylic resin mixture) is. An injection condition and a circular die used for the evaluations are as follows.

Set molding temperature: heater 1: 250° C., heater 2: 260° C., and heater 3: 260° C.,
heater 4: 240° C. and heater 5: 220° C.
Die temperature: 60° C.
Injection speed: 100 mm/sec
Holding pressure: 50 MPa
Holding pressure time: 5 seconds
Cooling time: 30 seconds
Number of revolutions of screw at the time of weighing: 60 rpm
Back pressure: 10 MPa
A weighing position of the screw was adjusted so that the maximum injection pressure became 150 MPa, and the flow length of the resin at the time was read.
Circular spiral die: a circular spiral die with a thickness of 2 mm and a width of 10 mm was used.

<Evaluation Method of "Solvent Resistance">

Firstly, the methacrylic resin compositions of the following Examples 1 to 6 and Comparative Examples 2 to 6 or the methacrylic resin mixture of Comparative Example 1 were injection molded with the use of an injection molding machine ("IS 130 F—V type" made by Toshiba Machine Co., Ltd.), and flat plates with a length of 250 mm×a width of 25.4 mm×a thickness of 3 mm were obtained. Incidentally, the injection conditions were as follows.

Set molding temperature: HN: 260° C., H1: 260° C., H2: 260° C., H3: 230° C., and H4: 210° C.
Die temperature: 60° C.
Molding Cycle
Injection timer (TR1): 18%, cooling timer (TR3): 30%, and intermediate timer (TR4): 3%
Pressure During Holding Pressure
PH 1 to PH 4: the pH was adjusted so that no sink mark occurred in the molded component.
Holding pressure timer TRH 1: 12 seconds, TRH 2: 7 seconds, and TRH 3: 30 seconds
Injection speed during holding pressure VH 1: 20%
Injection Speed at the Time of Filling
VI 1: 70%, VI 2: 65%, VI 3: 60%, VI 4: 53%, and VI 5: 44%
Weighing stroke position LS 5: the position was adjusted so that no sink mark occurred in the molded component.
Injection Speed Switching Position
LS 4A: 35 mm, LS 4B: 26 mm, LS 4C: 18 mm, and LS 4D: 12 mm
Holding pressure switching position LS 4: 8 mm
Number of revolutions of screw SRN: 96%
Back pressure of screw: 20%

Next, the obtained flat plate was dried in a vacuum dryer at 80° C. for 5 hours, and then was placed in a desiccator to obtain a test piece (flat plate having length of 250 mm×width of 25.4 mm×thickness of 3 mm).

The solvent resistance test was performed with the use of the obtained test piece. This test was performed in a constant temperature and humidity room of 23° C./40% RH. For the test method, a cantilever method was adopted, and the test was performed according to the following procedures of (a) to (d).

(a) Support one end of the test piece by sandwiching the one end on a fixing table, and support the test piece from the lower side of the test piece at a position (supporting point) 146 mm apart from the fixed position to keep the test piece horizontal.

(b) Apply a load to the other end of the test piece to generate a predetermined surface stress on the test piece.

(c) Apply ethanol ("reagent first grade ethanol" made by Wako Pure Chemical Industries, Ltd.) to the upper surface of the test piece. Incidentally, ethanol is periodically applied so that the ethanol does not disappear due to volatilization.

(d) Measure a time period (seconds) before crazing occurs on the test piece after the ethanol has been started to be applied. "Crazing occurrence time" (seconds) at a certain surface stress was measured with the above method, and the solvent resistance of the test piece was evaluated. Here, the crazing occurrence time means that the longer the crazing occurrence time is, the more excellent the solvent resistance is.

Incidentally, the load for the predetermined surface stress was calculated from the following expression (i).

$$\text{Surface stress(MPa)} = [(6 \times A \times B)/(C \times D^2)] \times 10^{-6} \quad \text{(i)}$$

A: Load (N)
B: Length from supporting point to position at which load is applied (m)
C: Width of test piece (m)
D: Thickness of test piece (m)

<Evaluation Method of "Surface Impact Resistance">

The methacrylic resin compositions of the following Examples 1 to 6 and Comparative Examples 2 to 6 or the methacrylic resin mixture of Comparative Example 1 were injection molded with the use of an injection molding machine ("Si-180 V CH 450 C model" made by Toyo Machinery & Metal Co., Ltd.), and flat plates with a length of 150 mm×a width of 90 mm×a thickness of 2 mm were obtained. Incidentally, the injection conditions were as follows.

Set molding temperature: heater 1: 255° C., heater 2: 260° C., and heater 3: 260° C.
Heater 4: 240° C., heater 5: 220° C., and hopper: 60° C.
Die temperature: 60° C.
Injection speed: 20 mm/sec
Holding pressure: 60 MPa
Holding pressure time: 5 seconds
Cooling time: 30 seconds
Number of revolutions of screw: 60 rpm
Back pressure: 10 MPa The evaluation test method of the surface impact resistance of the methacrylic resin compositions of Examples 1 to 6 and Comparative Examples 2 to 6 or the methacrylic resin mixture of Comparative Example 1, which will be described below, will be described with reference to FIGS. 5 and 6. Incidentally, FIG. 5 is a schematic view of one example of a state in which a test piece (109) is fixed on a test jig (112), when viewed from the top; and FIG. 6 is a schematic view of one example of a state in which a metal ball (111) is dropped onto the test piece (109) fixed on the test jig (112), when viewed from the side.

Figure 5:
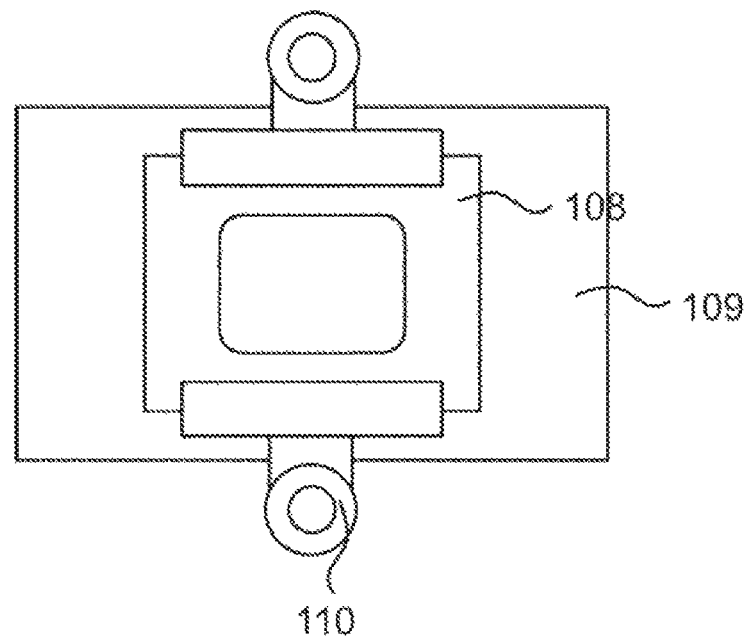
FIG. 5 shows a schematic view showing an evaluation test (before starting test) for surface impact resistance.
Figure 6:
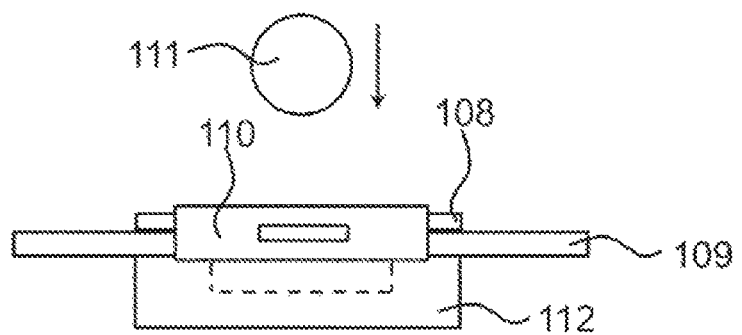
FIG. 6 shows a schematic view showing the evaluation test (during testing) for the surface impact resistance.

First, as shown in FIGS. 5 and 6, the test piece (109) having a length of 15 cm× a width of 9 cm×a thickness of 2 mm was placed on the test jig (112), an iron plate (108) was further placed thereon, and the test piece (109) was fixed to the jig with a clip or the like (110) as in FIGS. 5 and 6. In the test jig (112), there is a space having a length of 3.5 cm× a width of 4.7 cm× a height of 1.9 cm so as to drop the metal ball thereon, and the iron plate (108) is a plate of which the center portion is cut out into a rectangular shape of a length of 15 cm×a width of 9 cm when viewed from the top, and of which the thickness is 2 mm. In addition, a flat plate obtained by injection molding was conditioned at 23° C./40% RH atmosphere for 12 hours, and the resultant plate was used as the test piece.

Next, a steel ball of the weight of 31.9 g was dropped onto the center of the flat plate, and 50% fracture energy (mJ) was measured with the use of the methacrylic resin composition (or methacrylic resin mixture) in accordance with the staircase method (fixed dropping mass) of JIS K 7211-1, and the measured value was determined to be "surface impact strength". In addition, a drop impact tester 473311-1 (made by Toyo Seiki Seisaku-sho, Ltd.) was used as the test device. Here, the surface impact strength means that the higher the surface impact strength is, the more excellent the surface impact resistance is.

<Evaluation Method of "Stringing Resistance">
(Method for Producing Test Piece for Performing Evaluation Test of Stringing Resistance)

A flat plate (101) having a length of 210 mm×a width of 120 mm×a thickness of 3 mm was produced by an operation of injection molding methacrylic resin compositions of the following Examples 1 to 6 and Comparative Examples 2 to 6 or a methacrylic resin mixture of Comparative Example 1, which were objects of the evaluation test, with the use of an injection molding machine ("IS 130 F-V model" made by Toshiba Machine Co., Ltd.") (see FIG. 1). Injection conditions were as follows.

Set Molding Temperature
HN: 260° C., H1: 260° C., H2: 260° C., H3: 230° C., and H4: 210° C.
Die temperature: 60° C.
Molding Cycle Injection timer (TR1): 18%, cooling timer (TR3): 30%, and intermediate timer (TR4): 3%
Pressure During Holding Pressure
PH1 to PH4: the pH was adjusted so that no sink mark occurred in the molded component.
Holding Pressure Timer
TRH 1: 12 seconds, TRH 2: 7 seconds, and TRH 3: 30 seconds
Injection speed during holding pressure VH 1: 20%
Injection Speed During Filling
VI 1: 70%, VI 2: 65%, VI 3: 60%, VI 4: 53%, and VI 5: 44%, and metering stroke position LS 5: the position was adjusted so that no sink mark occurred in the molded component.
Injection Speed Switching Position
LS 4A: 35 mm, LS 4B: 26 mm, LS 4C: 18 mm, and LS 4D: 12 mm
Holding pressure switching position LS 4: 8 mm
Number of revolutions of screw SRN: 96%
Back pressure of screw: 20%

Figure 2:
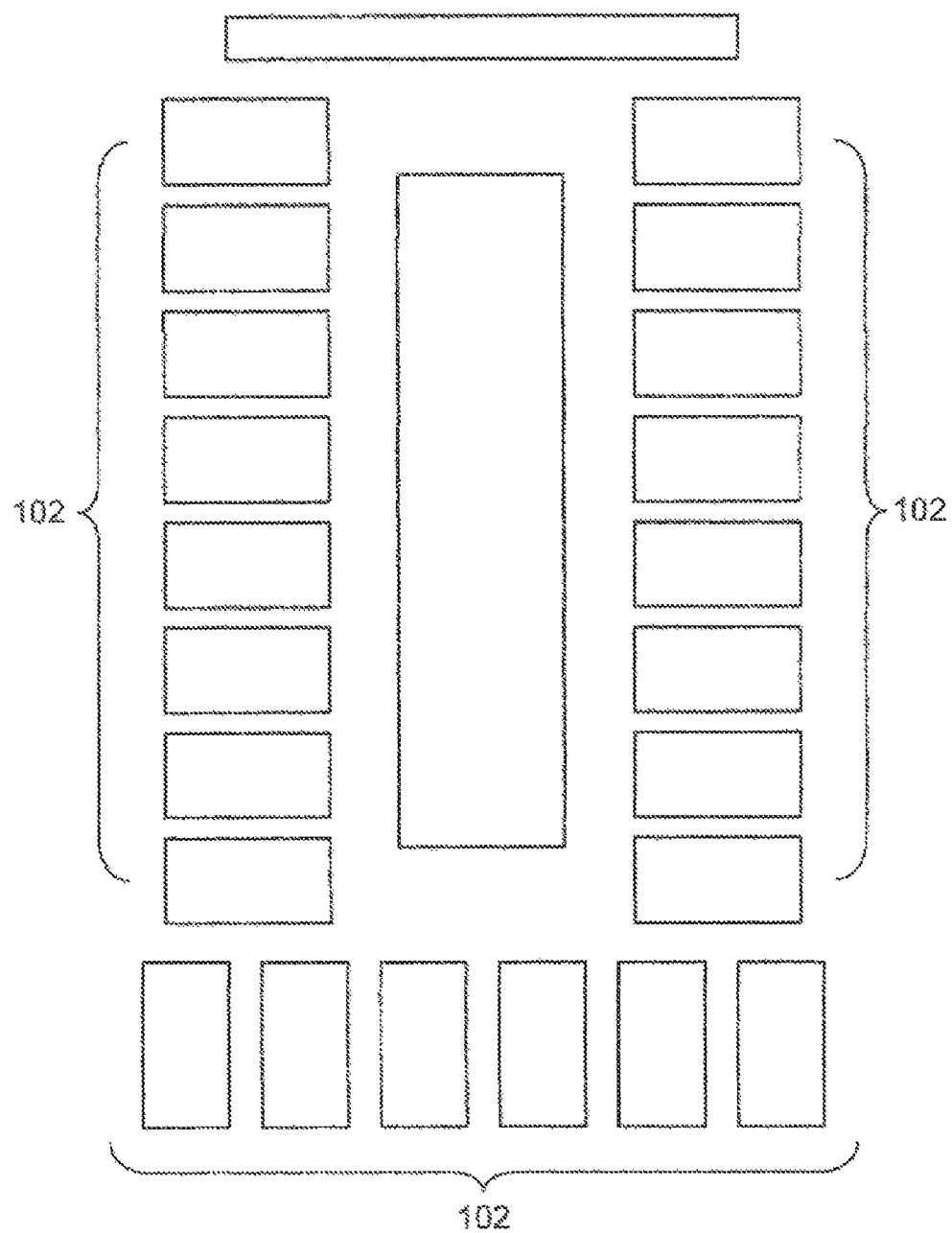
FIG. 2 shows test pieces (after having been cut) to be used in the evaluation test for the stringing resistance.

Next, this flat plate (101) was cut into test pieces (102) each having a length of 20 mm×a width of 40 mm×a thickness of 3 mm as shown in FIG. 2, by a panel saw, and 22 test pieces (102) in total were produced. The test piece was dried in a vacuum dryer at 80° C. for 8 hours or longer, then was conditioned in a constant temperature and humidity room of 23° C./40% RH for 12 hours or longer, and then was used for the test. Incidentally, FIG. 1 is a schematic view of the flat plate (101) before being cut when viewed from the top side; and FIG. 2 is a schematic view of each of the test pieces (102) after having been cut when viewed from the top side.

(Evaluation Test Method of Stringing Resistance)

The evaluation test method of the stringing resistance of the methacrylic resin compositions of Examples 1 to 6 and Comparative Examples 2 to 6 or the methacrylic resin mixture of Comparative Example 1, which will be described below, will be described in detail with reference to FIGS. 3 and 4. Incidentally, FIG. 3 is a schematic view showing one example of a state before the start of the evaluation test; and FIG. 4 is a schematic view showing one example of a state in which a test piece (102) of a methacrylic resin composition (or a methacrylic resin mixture) is stringy in this evaluation test.

Figure 3:
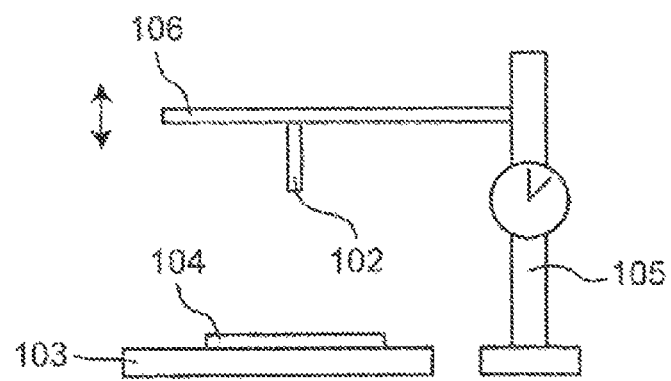
FIG. 3 shows a schematic view showing the evaluation test (before starting test) for the stringing resistance.

As shown in FIG. 3, a plate made from SUS 34 having a length of 15 cm× a width of 15 cm×a thickness of 3 mm was laid on a hot plate (103), and the plate made from SUS 34 was used as a hot platen (104). On the other hand, an aluminum rod (106) was pinched by a height gauge (105) of which the height was adjustable, and furthermore, the test piece (102) of the methacrylic resin composition (or methacrylic resin mixture) having a length of 20 mm×a width of 40 mm×a thickness of 3 mm obtained by the above described production method was clipped and fixed to the aluminum rod (106).

Figure 4:
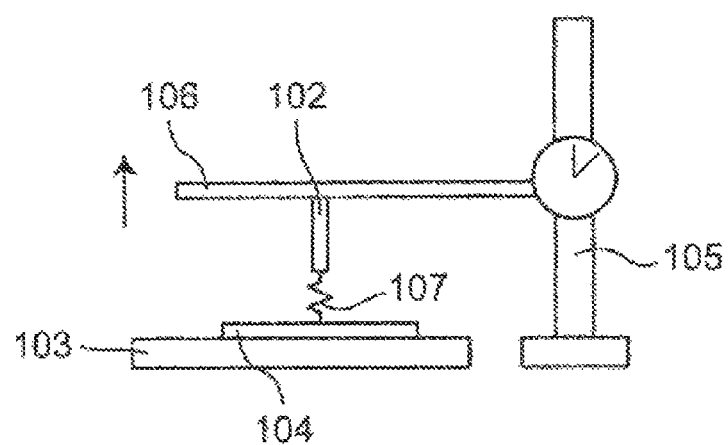
FIG. 4 shows a schematic view showing the evaluation test (during testing) for the stringing resistance.

Next, a surface (20 mm×3 mm) which was not cut by the panel saw at the time of production of the test piece (102) was pressed against the hot platen (104) which was heated to a predetermined temperature, for 15 seconds, thereby a contact part of the test piece (102) was melted on the hot platen (104), then the test piece (102) was lifted up as shown in FIG. 4, and the length of a string (107) was read out with a scale of the height gauge (105).

The above described operation was repeated five times, and the average value of the lengths of the string of the test piece at a predetermined temperature was determined. The temperature of the hot platen is raised by 20° C. firstly from 240° C., and the measurement is continued. Then, the temperature at which the average value of the lengths of the string became 10 mm or longer for the first time was determined as a "stringing start temperature" (° C.). Here, the stringing start temperature means that the higher the stringing start temperature is, the better the stringing resistance is.

<Method for Measuring "Vicat Softening Temperature">

A Vicat softening temperature (° C.) of the test piece was measured which was obtained by injection molding the following methacrylic resin compositions of Examples 1 to 6 and Comparative Examples 2 to 6, or the methacrylic resin mixture of Comparative Example 1, in accordance with JIS K 7206 (B 50 method), with the use of a heat distortion tester ("148-6 series type" made by Yasuda Seiki Seisakusho, Ltd.).

<Evaluation Method of Methacrylic Resin Composition and Methacrylic Resin Mixture>

Next, the evaluation method of the methacrylic resin composition (or methacrylic resin mixture) by thermal decomposition gas chromatography will be described in detail.

(Thermal Decomposition Measurement)

Pellets of the methacrylic resin compositions of Examples 1 to 6 and Comparative Examples 2 to 6 or the methacrylic resin mixture of Comparative Example 1, which would be described below, were analyzed with thermal decomposition gas chromatography under the following conditions, then the areas of the peaks corresponding to the methyl methacrylate and the methyl acrylate used as the monomer components were measured, respectively, and thereby each of the methacrylic resin compositions (or methacrylic resin mixture) was evaluated.

(Thermal Decomposition Condition)

Sample preparation: the methacrylic resin composition (or methacrylic resin mixture) was precisely weighed (2 to 3 mg as target), and was placed in the central part of a gutter-shaped metal cell, the metal cell was folded, both of the ends were gently pressed with a pair of pliers, and the metal cell was sealed.

Thermal decomposition device: CURIE POINT PYROLYZER JHP-22 (made by Japan Analytical Industry Co., Ltd.)

Metal cell: Pyrofoil F590 (made by Japan Analytical Industry Co., Ltd.)

Set temperature of thermostatic oven: 200° C.
Set temperature of temperature holding pipe: 250° C.
Thermal decomposition temperature: 590° C.
Thermal decomposition time: 5 seconds (Gas Chromatography Analysis Condition)

Gas chromatography analyzer: GC-14B (made by Shimadzu Corporation)
Detection method: FID
Column: 7G 3.2 m×3.1 mm φ (made by Shimadzu Corporation)
Filler: FAL-M (made by Shimadzu Corporation, packed column)
Carrier gas: Air/$N_2$/$H_2$=50/100/50 (kPa), and 80 ml/min
Temperature raising condition of column: holding at 100° C. for 15 minutes→heating up to 150° C. at 10° C./min→holding at 150° C. for 14 minutes
INJ temperature: 200° C.
DET temperature: 200° C.

Each of the methacrylic resin compositions (or the methacrylic resin mixture) was thermally decomposed under the above described thermal decomposition conditions; and an area (a1) of a peak corresponding to the methyl methacrylate and an area (b1) of a peak corresponding to the methyl acrylate were measured, which were detected when the generated decomposition product was measured under the above described gas chromatographic analysis conditions. Then the area ratio (A) (=b1/a1) between the peaks was determined from the areas of these peaks.

On the other hand, a standard preparation of the methacrylic resin in which a weight ratio of the methyl acrylate unit with respect to the methyl methacrylate unit was represented by W0 (known) (weight of methyl acrylate unit/weight of methyl methacrylate unit) was thermally decomposed under the above described thermal decomposition conditions; an area (a0) of a peak corresponding to the methyl methacrylate and an area (b0) of a peak corresponding to the methyl acrylate were measured, which were detected when the generated decomposition product was measured under the above described gas chromatographic analysis conditions; and an area ratio A0 (=b0/a0) of the peak was determined from the areas of these peaks.

Then, a factor f (=W0/A0) was determined from the area ratio A0 of the peak and the above described weight ratio W0.

Next, by multiplying the above described area ratio (A) of the peak by the above described factor f, a weight ratio W (weight of methyl acrylate unit/weight of methyl methacrylate unit) of the methyl acrylate unit with respect to the methyl methacrylate unit in the methacrylic resin was determined that was contained in the above described methacrylic resin composition (or methacrylic resin mixture) which was an object to be measured; and the ratio (wt %) of the methyl methacrylate unit and the ratio (wt %) of the methyl acrylate unit with respect to the total amount of the methyl methacrylate unit and the methyl acrylate unit were each calculated from this weight ratio W. In the following Examples and Comparative Examples, the ratio (wt %) of the methyl methacrylate unit and the ratio (wt %) of the methyl acrylate unit in the methacrylic resin contained in the methacrylic resin composition, in particular, were determined.

(Gpc Measurement)

The pellets of the methacrylic resin compositions of Examples 1 to 6 and Comparative Examples 2 to 6, or the methacrylic resin mixture of Comparative Example 1, which would be described below were analyzed by GPC measurement under the following conditions, and W1, W2 and W3 were obtained. In addition, the weight average molecular weight of each of the methacrylic resins, and the HP, the LP and the PR of the methacrylic resin mixture were evaluated.

(GPC Analysis Condition)

Measuring device: HLC-8220 made by Tosoh Corporation
Column: Two columns of TSKgel super HM-H and one column of Super H 2500 were connected in series.
Detector: RI detector
Solution adjustment: THF was used as a solvent, and 0.4% solution of a sample was used.
Column temperature: 40° C.
Injection amount: 10 μL
Flow rate: 0.35 ml/min RI detection intensity with respect to the elution time of each of the methacrylic resin compositions (or methacrylic resin mixtures) was measured under the above described conditions. The following seven methacrylic resins (Shodex STANDARD M-75, made by Showa Denko K.K.) of which the monodisperse weight average molecular weights were known and of which the molecular weights were different from each other were used as standard samples for a calibration curve. Weight average molecular weight

| | |
|---|---|
| Standard sample 1 | 927000 |
| Standard sample 2 | 524000 |
| Standard sample 3 | 203000 |
| Standard sample 4 | 62200 |
| Standard sample 5 | 20000 |
| Standard sample 6 | 6570 |
| Standard sample 7 | 2920 |

(Way of determining W1, W2 and W3)

Differential molecular weight distribution curves were prepared by the previously described method, from the results obtained on the methacrylic resin compositions of Examples 1 to 6 and Comparative Examples 2 to 6 or the methacrylic resin mixture of Comparative Example 1, under the above described GPC analysis conditions. When among points at which a differential molecular weight distribution curve intersects with a straight line of dW/d(log M)=0, a point on the low molecular weight side shall be represented by a point (A) (starting point) and a point on the high molecular weight side shall be represented by a point (B) (end point), and a peak area surrounded by a curve line from the starting point to the end point and the above described straight line is supposed to be 100, "W1" was calculated as a proportion (%) of the area from the starting point to the molecular weight of 30000, "W2" was calculated as a proportion (%) of the area from the starting point to the molecular weight of 80000, and "W3" was calculated as a proportion (%) of the area from the molecular weight of 300000 to the end point, each with respect to the peak area from the starting point to the end point.

(Way of Determining Weight Average Molecular Weight and HP, LP and PR)

The weight average molecular weight of each of the methacrylic resins was determined, by preparing a differential molecular weight distribution curve from the results obtained under the above described GPC analysis conditions by the previously described method. In addition, the HP, the LP and the PR of the methacrylic resin mixture were determined by operations of: preparing a differential molecular weight distribution curve from the results obtained under the above described GPC analysis conditions by the previously described method; defining the HP as the highest peak molecular weight in the peak molecular weights in the differential molecular weight distribution curve, and defining the LP as the peak molecular weight lower than HP; and furthermore when in the differential molecular weight distribution curve, defining (a) as a value indicating the height of the peak of the HP, and defining (b) as a value indicating the height of the peak of the LP, determining a value shown by (a)/(b) as the PR.

Hereinafter, the present invention will be described more in detail with reference to Examples. In Examples and Comparative Examples of the present invention, the following methacrylic resin mixtures (1) to (2) and methacrylic resins (3) to (5) were used.

(Concerning Production of Methacrylic Resin Mixture (1))

In the present example, the methacrylic resin mixture was produced in a form of pellets, which was obtained by performing continuous polymerization in two stages according to the above described exemplary embodiment, schematically with reference to FIG. 7.

In the present example, in order to produce the methacrylic resin mixture, the apparatus shown in FIG. 7 was used. A fully mixing type reaction tank of which the capacity was 13 L was used as a first reaction tank 10, and a fully mixing type reaction tank of which the capacity was 8 L was used as a second reaction tank 20.

In the first reaction tank 10, 99.8 parts by mass of methyl methacrylate, 0.500 parts by mass of methyl acrylate, 0.101 parts by mass of a chain transfer agent [n-octyl mercaptan], 0.100 parts by mass of a mold release agent [stearyl alcohol], and 0.00850 parts by mass of a polymerization initiator [t-amyl peroxy-2-ethylhexanoate] were mixed to obtain a syrup 1.

In addition, the flow rate was adjusted so that the residence time of the syrup 1 in the first reaction tank 10 became 61.8 minutes.

The temperature (T1) in the first reaction tank 10 was 127° C., the temperature of a jacket 13 surrounding the outer wall surface of the first reaction tank 10 was set at 127° C., and the continuous polymerization was performed in an adiabatic state in which heat substantially does not enter and exit the tank.

Next, a raw material monomer solution 2 is prepared which will be supplied to a second reaction tank 20. Incidentally, this raw material monomer solution 2 was prepared by mixing 95.1 parts by mass of methyl methacrylate, 0.500 parts by mass of methyl acrylate, 4.33 parts by mass of the chain transfer agent [n-octyl mercaptan], and 0.0696 parts by mass of a polymerization initiator [1,1-di(t-butylperoxy) cyclohexane].

In the second reaction tank 20, the flow rate was adjusted so that the raw material monomer solution 2 and the syrup 1 were mixed at a mass ratio of 1:9.7. Incidentally, the residence time of the mixture in the second reaction tank 20 was 37.5 minutes.

The temperature (T2) in the second reaction tank 20 was 186° C., the temperature of a jacket 23 surrounding the outer wall surface of the second reaction tank 20 was set at 186° C., and the continuous polymerization was performed in the adiabatic state in which heat substantially does not enter and exit the tank to obtain a syrup 2.

Incidentally, this continuous polymerization was performed in a state (full liquid state) in which the first reaction tank 10 and the second reaction tank 20 were filled with the reaction mixture (mixed liquid), and a gas phase did not substantially exist.

The reaction mixture in the second reaction tank 20 was continuously extracted as the methacrylic resin composition, from a discharge port 21 b which is positioned at the top of the second reaction tank 20. Thereby obtained methacrylic resin composition was passed to an extracting line 25 and was heated to 200° C. by a preheater 31; and in a devolatilizing extruder 33 provided with a vent, a volatile component such as an unreacted raw material monomer was removed at 250° C., the methacrylic resin composition after devolatilization was extruded in a molten state, was cooled with water, then was cut, and was discharged as pellets from a discharge line 35. Thereby, the methacrylic resin mixture was produced in a form of pellets (hereinafter referred to as "methacrylic resin mixture (1)").

The HP of the methacrylic resin mixture (1) was 186000, the LP was 27000, and the PR was 1.36.

(Concerning Production of Methacrylic Resin Mixture (2))

A pelletized methacrylic resin mixture (hereinafter referred to as "methacrylic resin mixture (2)") was obtained in a similar way to that of the production method for the methacrylic resin mixture (1), except that in the production of the methacrylic resin mixture (1), the amount of the chain transfer agent [n-octyl mercaptan] mixed in the first reaction tank 10 was changed to 0.093 parts by mass, and the amount of the chain transfer agent [n-octyl mercaptan] contained in the raw material monomer solution 2 supplied to the second reaction tank 20 was changed to 4.49 parts by mass. The HP of the methacrylic resin mixture (2) was 213000, the LP was 27000, and the PR was 1.38.

(Concerning Methacrylic Resin (3))

To a polymerization reactor equipped with a stirrer, 96.8 parts by weight of methyl methacrylate, 2.95 parts by weight of methyl acrylate, 0.0323 parts by weight of 1,1-di(t-butylperoxy) cyclohexane as the polymerization initiator, 0.178 parts by weight of n-octyl mercaptan as the chain transfer agent, and stearyl alcohol in an amount corresponding to 0.1 weight phr of the total amount of the finally obtained resin composition were each continuously supplied; and a polymerization reaction was performed at 175° C. for the average residence time of 27.0 minutes. Subsequently, the reaction liquid having come out from the polymerization reactor was supplied to a devolatilizing extruder, an unreacted monomer component was vaporized and recovered, and the resultant reaction liquid was sufficiently kneaded, and then was shaped; and a pelletized methacrylic resin was obtained (hereinafter referred to as "methacrylic resin (3)").

The weight average molecular weight of the methacrylic resin (3) was 93000.

(Concerning Methacrylic Resin (4))

To a polymerization reactor equipped with a stirrer, 97.0 parts by weight of methyl methacrylate, 2.89 parts by weight of methyl acrylate, 0.0160 parts by weight of 1,1-di(t-butylperoxy) cyclohexane as the polymerization initiator, 0.0850 parts by weight of n-octyl mercaptan as the chain transfer agent, and stearyl alcohol in an amount corresponding to 0.1 weight phr of the total amount of the finally obtained resin composition were each continuously supplied, and the polymerization reaction was performed at 175° C. for the average residence time of 36.1 minutes. Subsequently, a reaction liquid having come out from the polymerization reactor was supplied to a devolatilizing extruder, an unreacted monomer component was vaporized and recovered, and the resultant reaction liquid was sufficiently kneaded, and then was shaped; and a pelletized methacrylic resin was obtained (hereinafter referred to as "methacrylic resin (4)").

The weight average molecular weight of the methacrylic resin (4) was 158000.

(Concerning Methacrylic Resin (5))

To a polymerization reactor equipped with a stirrer, 91.6 parts by weight of methyl methacrylate, 8.00 parts by weight of methyl acrylate, 0.0097 parts by weight of t-amyl peroxy-2-ethylhexanoate as the polymerization initiator, 0.389 parts by weight of n-octyl mercaptan as the chain transfer agent, and stearyl alcohol in an amount corresponding to 0.1 weight phr of the total amount of the finally obtained resin composition were each continuously supplied, and the polymerization reaction was performed at 140° C. for the average residence time of 59.1 minutes. Subsequently, the reaction liquid having come out from the polymerization reactor was supplied to a devolatilizing extruder, an unreacted monomer component was vaporized and recovered, and the resultant reaction liquid was sufficiently kneaded, and then was shaped; and a pelletized methacrylic resin was obtained (hereinafter referred to as "methacrylic resin (5)").

The weight average molecular weight of the methacrylic resin (5) was 65000.

Example 1

The methacrylic resin mixture (1) in an amount of 90 wt % and the methacrylic resin (3) in an amount of 10 wt % were mixed. Subsequently, the mixture was melt-kneaded so that the resin temperature was 250° C., and was extruded in a form of a strand, with the use of a single screw extruder (screw diameter of 40 mm); the strand was cooled with water and was cut with a strand cutter, and thereby a pelletized methacrylic resin composition was obtained, and was subjected to the measurement of various physical properties. In addition, a differential molecular weight distribution curve of the obtained methacrylic resin composition was shown in FIG. 8.

Example 2

A pelletized methacrylic resin composition was obtained in a similar way to that in Example 1, except that 80 wt % of the methacrylic resin mixture (1) and 20 wt % of the methacrylic resin (3) were mixed. Various physical properties were evaluated with the use of the obtained methacrylic resin composition.

Example 3

A pelletized methacrylic resin composition was obtained in a similar way to that in Example 1, except that 70 wt % of the methacrylic resin mixture (1) and 30 wt % of the methacrylic resin (3) were mixed. Various physical properties were evaluated with the use of the obtained methacrylic resin composition.

Example 4

A pelletized methacrylic resin composition was obtained in a similar way to that in Example 1, except that 90 wt % of the methacrylic resin mixture (1) and 10 wt % of the methacrylic resin (4) were mixed. Various physical properties were evaluated with the use of the obtained methacrylic resin composition.

Example 5

A pelletized methacrylic resin composition was obtained in a similar way to that in Example 1, except that 80 wt/o of the methacrylic resin mixture (1) and 20 wt % of the methacrylic resin (4) were mixed. Various physical properties were evaluated with the use of the obtained methacrylic resin composition.

Example 6

A pelletized methacrylic resin composition was obtained in a similar way to that in Example 1, except that 70 wt % of the methacrylic resin mixture (1) and 30 wt % of the methacrylic resin (4) were mixed. Various physical properties were evaluated with the use of the obtained methacrylic resin composition.

Comparative Example 1

Various physical properties of the methacrylic resin mixture (1) were measured.

Comparative Example 2

A pelletized methacrylic resin composition was obtained in a similar way to that in Example 1, except that 60 wt % of the methacrylic resin mixture (1) and 40 wt % of the methacrylic resin (3) were mixed. Various physical properties were evaluated with the use of the obtained methacrylic resin composition.

Comparative Example 3

A pelletized methacrylic resin composition was obtained in a similar way to that in Example 1, except that 60 wt % of the methacrylic resin mixture (1) and 40 wt % of the methacrylic resin (4) were mixed. Various physical properties were evaluated with the use of the obtained methacrylic resin composition.

Comparative Example 4

A pelletized methacrylic resin composition was obtained in a similar way to that in Example 1, except that 75 wt % of the methacrylic resin mixture (1) and 25 wt % of the methacrylic resin (5) were mixed. Various physical properties were evaluated with the use of the obtained methacrylic resin composition.

Comparative Example 5

A pelletized methacrylic resin composition was obtained in a similar way to that in Example 1, except that 75 wt % of the methacrylic resin mixture (2) and 25 wt %/o of the methacrylic resin (4) were mixed. Various physical properties were evaluated with the use of the obtained methacrylic resin composition.

Comparative Example 6

A pelletized methacrylic resin composition was obtained in a similar way to that in Example 1, except that 48 wt/o of the methacrylic resin mixture (1), 39 wt % of the methacrylic resin (3) and 13 wt % of the methacrylic resin (4) were mixed. Various physical properties were evaluated with the use of the obtained methacrylic resin composition.

A ratio of the methyl acrylate and a ratio of the methyl methacrylate, which were obtained by measuring the methacrylic resin contained in the methacrylic resin composition (or methacrylic resin mixture) obtained in each of Examples and Comparative Examples, and the evaluation result by the above described evaluation method were collectively described in Table 1.

TABLE 1

| | W1 (%) 18-27 | W2 (%) 41-52 | W3 (%) 10-14 | Ratio (wt %) of methyl acrylate in methacrylic redin contained in methacrylic resin composition | Ratio (wt %) methyl methacrylate in methacrylic resin contained in methacrylic resin composition | Surface impact strength (mJ) | Spiral flow length (mm) | Crazing occurence time (sec) | Vicat softening temperatre (° C.) | Stringing start temperature (° C.) |
|---|---|---|---|---|---|---|---|---|---|---|
| Example 1 | 26 | 49 | 12 | 1.0 | 99.0 | 102 | 437 | 16.6 | 110 | 280 |
| Example 2 | 24 | 49 | 11 | 1.3 | 98.7 | 102 | 433 | 18.3 | 110 | 260 |
| Example 3 | 23 | 49 | 10 | 1.5 | 98.5 | 117 | 435 | 17.8 | — | 260 |
| Example 4 | 26 | 47 | 13 | 1.0 | 99.0 | 102 | 425 | 17.0 | 110 | 280 |
| Example 5 | 23 | 44 | 13 | 1.2 | 98.8 | 113 | 410 | 19.6 | 110 | 280 |
| Example 6 | 21 | 43 | 12 | 1.4 | 98.6 | 126 | 400 | 23.4 | 109 | 280 |
| Comparative example 1 | 28 | 49 | 13 | 0.7 | 99.3 | 86 | 439 | 16.8 | 111 | 280 |
| Comparative example 2 | 23 | 50 | 9 | 2.1 | 97.9 | 120 | 439 | 12.5 | 108 | 240 |
| Comparative example 3 | 19 | 40 | 13 | — | — | 128 | 385 | 292 | 109 | 280 |
| Comparative example 4 | 27 | 55 | 10 | 1.7 | 98.3 | 102 | 456 | 5.2 | 109 | 240 |
| Comparative example 5 | 22 | 42 | 16 | 1.3 | 98.7 | 120 | 384 | 19.8 | 108 | 230 |
| Comparative example 6 | 17 | 41 | 12 | 2.0 | 98.0 | 139 | 376 | 11.8 | — | 260 |

In each of Examples 1 to 6, the values of the W1, the W2 and the W3 are in the ranges of the conditions (I) to (III) specified in the present invention, in other words, satisfy all of the conditions (I) to (III), and accordingly all physical properties of the surface impact strength, the spiral flow length, the crazing occurrence time, and the stringing start temperature are excellent.

In Comparative Example 1, the value of the W1 is higher than the specified range, and accordingly the surface impact strength is low, as compared to those in Examples 1 to 6.

In Comparative Example 2, the value of the W3 is lower than the specified range. As a result, the crazing occurrence time is short and the stringing start temperature is also low, as compared to those in Examples 1 to 6.

In Comparative Example 3, the value of the W2 is lower than the specified range. As a result, the value of the spiral flow length is low, as compared to those in Examples 1 to 6.

In Comparative Example 4, the value of the W2 is higher than the specified range. As a result, the crazing occurrence time is short, and the stringing start temperature is also low, as compared to those in Examples 1 to 6.

In Comparative Example 5, the value of the W3 is higher than the specified range. As a result, the value of the spiral flow length is low, as compared to those in Examples 1 to 6.

In Comparative Example 6, the value of the W1 is lower than the specified range. As a result, the value of the spiral flow length is low, and the crazing occurrence time is short, as compared to those in Examples 1 to 6.

As described above, Comparative Examples 1 to 6 did not satisfy all of the conditions (I) to (III) specified in the present invention, and accordingly could not keep all of the excellent surface impact resistance, fluidity, solvent resistance and stringing resistance at a satisfactory level, as in Examples 1 to 6 of the present invention.

INDUSTRIAL APPLICABILITY

The methacrylic resin composition of the present invention can be used as a raw material resin composition in injection molding, and can be used for manufacture of molded objects, in particular, for applications for vehicles (for example, applications for vehicles such as automobiles, motorcycles, trains, and steam trains). For example, the methacrylic resin composition can be used as molding materials for members for vehicles such as a tail lamp cover, a head lamp cover, a cover of a meter panel, and a visor. In addition, the methacrylic resin composition can also be used as materials for molding for optical members such as lenses, display protection plates, optical films and light guide plates, and for members for cosmetic containers.

REFERENCE SIGNS LIST

101: Flat plate
102 and 109: Test piece
103: Hot plate
104: Hot platen
105: Height gauge
106:
107:
108: Iron plate
110:
111: Metal ball

The invention claimed is:

1. A methacrylic resin composition comprising at least one methacrylic resin and satisfying the following conditions (I), (II) and (III):
   (I) when a proportion (%) of a peak area from a starting point to a molecular weight of 30000 with respect to a peak area from the starting point to an end point in a differential molecular weight distribution curve of the methacrylic resin composition is represented by W1, a value of the W1 satisfies an expression: $18 \leq W1 \leq 27$;
   (II) when a proportion (%) of a peak area from the starting point to a molecular weight of 80000 with respect to the peak area from the starting point to the end point in the differential molecular weight distribution curve of the methacrylic resin composition is represented by W2, a value of the W2 satisfies an expression: $41 \leq W2 \leq 52$; and
   (III) when a proportion (%) of a peak area from a molecular weight of 300000 to the end point with respect to the peak area from the starting point to the end point in the differential molecular weight distribution curve of the methacrylic resin composition is represented by W3, a value of the W3 satisfies an expression: $10 \leq W3 \leq 14$,
   wherein the methacrylic resin composition comprises three or more methacrylic resins having different weight average molecular weights from each other, as the at least one methacrylic resin.

2. The methacrylic resin composition according to claim 1, wherein a content of the monomer unit derived from the alkyl methacrylate is 98.4 wt % or more with respect to 100 wt % of all monomer units contained in the methacrylic resin.

3. A molded object comprising the methacrylic resin composition according to claim 1.

4. A member for a vehicle, comprising the methacrylic resin composition according to claim 1.

5. A methacrylic resin composition comprising at least one methacrylic resin and satisfying the following conditions (I), (II) and (III):
   (I) when a proportion (%) of a peak area from a starting point to a molecular weight of 30000 with respect to a peak area from the starting point to an end point in a differential molecular weight distribution curve of the methacrylic resin composition is represented by W1, a value of the W1 satisfies an expression: $18 \leq W1 \leq 27$;
   (II) when a proportion (%) of a peak area from the starting point to a molecular weight of 80000 with respect to the peak area from the starting point to the end point in the differential molecular weight distribution curve of the methacrylic resin composition is represented by W2, a value of the W2 satisfies an expression: $41 \leq W2 \leq 52$; and
   (III) when a proportion (%) of a peak area from a molecular weight of 300000 to the end point with respect to the peak area from the starting point to the end point in the differential molecular weight distribution curve of the methacrylic resin composition is represented by W3, a value of the W3 satisfies an expression: $10 \leq W3 \leq 14$,
   wherein the methacrylic resin composition comprises a methacrylic resin having a weight average molecular weight of more than 180000 and 300000 or less; a methacrylic resin having a weight average molecular weight of 5000 or more and less than 70000; and a methacrylic resin having a weight average molecular weight of 70000 or more and 180000 or less, as the at least one methacrylic resin.

6. A methacrylic resin composition comprising at least one methacrylic resin and satisfying the following conditions (I), (II) and (III):
   (I) when a proportion (%) of a peak area from a starting point to a molecular weight of 30000 with respect to a peak area from the starting point to an end point in a differential molecular weight distribution curve of the methacrylic resin composition is represented by W1, a value of the W1 satisfies an expression: $18 \leq W1 \leq 27$;
   (II) when a proportion (%) of a peak area from the starting point to a molecular weight of 80000 with respect to the peak area from the starting point to the end point in the differential molecular weight distribution curve of the methacrylic resin composition is represented by W2, a value of the W2 satisfies an expression: $41 \leq W2 \leq 52$; and
   (III) when a proportion (%) of a peak area from a molecular weight of 300000 to the end point with respect to the peak area from the starting point to the end point in the differential molecular weight distribution curve of the methacrylic resin composition is represented by W3, a value of the W3 satisfies an expression: $10 \leq W3 \leq 14$,
   wherein the methacrylic resin composition comprises a methacrylic resin mixture including two methacrylic resins having mutually different peak molecular weights and satisfying the following conditions (IV), (V) and (VI); and a methacrylic resin having a weight average molecular weight of 70000 or more and 180000 or less, as the at least one methacrylic resin:
   (IV) when a highest peak molecular weight among peak molecular weights in a differential molecular weight distribution curve of the methacrylic resin mixture is represented by HP, a value of the HP satisfies an expression: 180000≤HP≤1220000;

(V) when a peak molecular weight lower than the HP among the peak molecular weights in the differential molecular weight distribution curve of the methacrylic resin mixture is represented by LP, a value of the LP satisfies an expression: 24000≤LP≤35000; and (VI) when a value indicating a height of the peak at the HP is represented by (a) and a value indicating a height of the peak at the LP is represented by (b) in the differential molecular weight distribution curve of the methacrylic resin mixture, a value of PR represented by (a)/(b) satisfies an expression: 1.32≤PR≤1.60.

* * * * *